(12) United States Patent
Higuchi et al.

(10) Patent No.: US 7,599,100 B2
(45) Date of Patent: Oct. 6, 2009

(54) IMAGE PROCESSING APPARATUS

(75) Inventors: Takafumi Higuchi, Nagano (JP);
Yoshihisa Motominami, Nagano (JP);
Nobuyuki Fujimori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 923 days.

(21) Appl. No.: 10/954,343

(22) Filed: Oct. 1, 2004

(65) Prior Publication Data

US 2005/0168763 A1 Aug. 4, 2005

(30) Foreign Application Priority Data

| Oct. 1, 2003 | (JP) | ............... P2003-342847 |
| Sep. 21, 2004 | (JP) | ............... P2004-272810 |
| Sep. 27, 2004 | (JP) | ............... P2004-280624 |

(51) Int. Cl.
H04N 1/00 (2006.01)
H04N 1/40 (2006.01)
H04N 1/04 (2006.01)

(52) U.S. Cl. .................. 358/403; 358/444; 358/449; 358/451; 358/453; 358/474; 358/527; 358/1.13; 358/1.16

(58) Field of Classification Search ................ 358/1.13, 358/426.14, 474, 444, 453, 449, 452, 403, 358/527, 451, 1.16; 382/318, 319, 232
See application file for complete search history.

(56) References Cited

U.S. PATENT DOCUMENTS

| 5,845,018 | A | * | 12/1998 | Breish ................ 382/276 |
| 5,973,734 | A | * | 10/1999 | Anderson .............. 348/239 |
| 6,278,447 | B1 | * | 8/2001 | Anderson .............. 715/723 |
| 6,630,938 | B1 | * | 10/2003 | Nanni .................. 345/629 |
| 6,847,388 | B2 | * | 1/2005 | Anderson .............. 715/854 |
| 7,079,696 | B2 | | 7/2006 | Koide |
| 7,155,049 | B2 | * | 12/2006 | Wetzel et al. .......... 382/133 |
| 2001/0033303 | A1 | * | 10/2001 | Anderson .............. 345/854 |
| 2002/0048413 | A1 | * | 4/2002 | Kusunoki .............. 382/282 |
| 2002/0054401 | A1 | * | 5/2002 | Sasaki et al. .......... 358/538 |
| 2003/0095269 | A1 | * | 5/2003 | Kubo et al. ............ 358/1.9 |
| 2003/0147563 | A1 | * | 8/2003 | Liu et al. .............. 382/276 |
| 2004/0205628 | A1 | * | 10/2004 | Rosenholtz et al. ..... 715/526 |

FOREIGN PATENT DOCUMENTS

| JP | 09-224123 A | 8/1997 |
| JP | 10-108011 A | 4/1998 |
| JP | 10-233916 A | 9/1998 |
| JP | 2002-44663 A | 2/2002 |
| JP | 2002-069392 A | 3/2002 |
| JP | 2002-300405 A | 10/2002 |
| JP | 2003-087498 A | 3/2003 |
| JP | 2003-131838 A | 5/2003 |

* cited by examiner

*Primary Examiner*—Cheukfan Lee
(74) *Attorney, Agent, or Firm*—Sughrue Mion, PLLC

(57) ABSTRACT

An original copy sheet is pre-scanned to obtain pre-scanned image data of a bit map form with a low resolution. The pre-scanned image data is converted to JPEG thumbnail image data. An EXIF file is formed in an external media to store the JPEG thumbnail image data in the EXIF file. The original copy sheet is mainly scanned to obtain main image data of a bit map form with a high resolution. The main image data is converted to JPEG main image data. In the EXIF file in the external media, the JPEG main image data is stored.

4 Claims, 21 Drawing Sheets

*FIG. 8*

| KIND | QUALITY | RESOLUTION | QUANTIZE STEP |
|---|---|---|---|
| TEXT | NORMAL | 200dpi | ROUGH |
| TEXT | FINE | 300dpi | ROUGH |
| GRAPHIC | NORMAL | 300dpi | ROUGH |
| GRAPHIC | FINE | 300dpi | FINE |

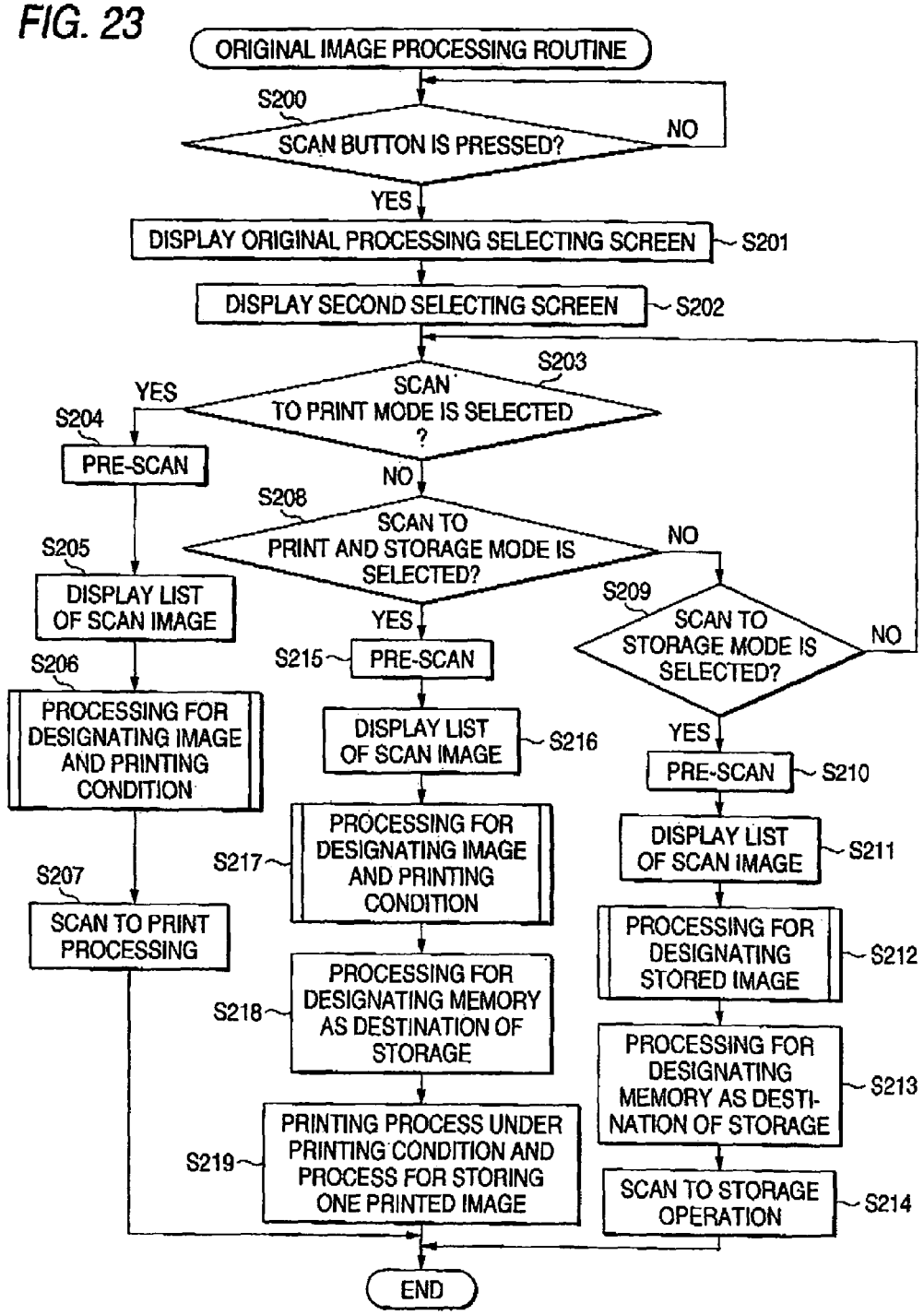

IMAGE PROCESSING APPARATUS

BACKGROUND OF THE INVENTION

The present invention relates to an image processing apparatus that can read out an image from an original copy sheet and can output the image data thereof to an external media.

A multifunction printer apparatus that includes an image scanner and a printer and can print an image read by the image scanner has been known (for instance, see Patent Document 1). Further, a printer having a function (a direct print function) connected to a digital still camera or a memory card for a digital still camera to input and print the image data therefrom has been known (for instance, see Patent Document 2). Further, in the digital still camera, the image data is incorporated in a file of a form called an EXIF (Exchangeable Image File Format) file and stored in the memory card (for instance, see Patent Document 3). In this EXIF file, the image data is incorporated in a JPEG form and the data of an image (a thumbnail image) obtained by reducing the image data is also incorporated in the JPEG form. The thumbnail image in the EXIF file can be used to display or print an image list from which, for instance, a user selects an image desired to be printed in the printer, Patent Document 1: JP-A-2003-087498

Patent Document 2: JP-A-2003-131838

Patent Document 3: JP-A-2002-069392

The above-described direct print function can be mounted on the above-described multifunction printer apparatus including the image scanner. In that case, if not only the image from the memory card for the digital camera can be printed, but also the image read by the image scanner can be stored in the memory card for the digital camera, this will be convenient. Further, in that case, if the image read by the image scanner can be stored in the form of the EXIF file, this will be more convenient, because the image can be treated in the same manner as that of an image photographed by the digital camera.

However, to obtain the image read by the image scanner in the form of the EXIF file, not only a process for compressing a main image as the read image itself to the JPEG form, but also a process for compressing a thumbnail image obtained by reducing the main image to the JPEG form is necessary. However, to form the thumbnail image from the main image, the data of the main image needs to be stored in the multifunction printer apparatus. Accordingly, the multifunction printer apparatus needs to have a memory of large capacity sufficient for holding and processing the data of the main image of large size. Especially, when the image scanner has a function for continuously reading a plurality of images from a photograph film strip, the data of all of the plurality of main images that are continuously read needs to be stored. Thus, a memory having a very large capacity is required. Not only in the multifunction printer apparatus, but also in the single image scanner, when the read image is to be outputted in the form of the EXIF file, the above-described problems arise.

SUMMARY OF THE INVENTION

Accordingly, it is an object of the present invention to improve a performance of an image processing apparatus and particularly to change an image read by an image scanner to the data of a predetermined form including a thumbnail image and a main image by a small memory capacity as much as possible.

An image processing apparatus according one aspect of the present invention comprises: an image scanner for reading an image from an original copy sheet; an external media interface connected to an external data media; and a control processing part for performing the control process of the image scanner and the external media interface and the process of image data. Here, the external media includes various kinds of external devices capable of transmitting and receiving data such as a digital still camera, a semiconductor memory card, a disk drive, a communication network, or the like. The control processing part includes a pre-scanning control unit for controlling the image scanner to pre-scan the original copy sheet and output pre-scanned image data of a bit map form with a predetermined low resolution from the image scanner; an encoded thumbnail image forming unit for encoding the pre-scanned image data outputted from the image scanner to form encoded thumbnail image data of a predetermined code form; a thumbnail image storage control unit for controlling the external media interface to store the encoded thumbnail image data formed by the encoded thumbnail image forming unit in the external media; a main scanning control unit for controlling the image scanner to mainly scan the original copy sheet and output main image data of a bit map form with a predetermined high resolution from the image scanner; an encoded main image forming unit for encoding the main image data outputted from the image scanner to form encoded main image data of a predetermined code form; and a main image storage control unit for controlling the external media interface to store the encoded main image data formed by the encoded main image forming unit in the external media. According to this image processing apparatus, the thumbnail image data is formed not from the main image data of large size obtained by the main scanning operation, but from the pre-scanned image data of small size read by the pre-scanning operation. Thus, the capacity of a memory necessary for forming the thumbnail image data may be small.

In the present invention, the encoded main image forming unit and the main image storage control unit encode the image data of each part outputted from the image scanner and store the encoded image data of each part in the external media in parallel with the reading operation of each part of the original copy sheet by the image scanner. Thus, since all of the main image data do not need to be stored and held, the capacity of a memory may be decreased.

In the present invention, the control processing unit further includes an area deciding unit for deciding a main scanning area to be mainly scanned from the area of the original copy sheet on the basis of the pre-scanned image data. The main scanning control unit controls the image scanner to mainly scan only the main scanning area of the original copy sheet. Accordingly, the pre-scanned data obtained by the pre-scanning operation of a time can be employed both for forming a thumbnail image and deciding the main scanning area. Further, a selective area mode in which only the main scanning area of the original copy sheet is mainly scanned and a maximum area mode in which all the area of the original copy sheet is mainly scanned may be automatically selected or may be selected in accordance with a command from a user.

According to the present invention, the thumbnail image storage control unit controls the external media interface to form a file of a predetermined format capable of accommodating the encoded thumbnail image data and the encoded main image data in the external media and store the encoded thumbnail image data from the encoded thumbnail image forming unit in the file in the external media; and the main image storage control unit controls the external media interface to store the encoded main image data from the encoded main image forming unit in the file in the external media. Here, the file of the predetermined form capable of accommodating the encoded thumbnail image data and the encoded main image data typically indicates, for instance, an EXIF file. Thus, the file of the predetermined form that is stored in the external media from a digital still camera or the like and the file of the predetermined form that is stored in the external media from the image processing apparatus can be treated in the same manner.

According to the present invention, a printer for printing the image is further provided. The control processing part includes: a thumbnail image reading control unit for controlling the external media interface to read the encoded thumbnail image data from the external media; a thumbnail image data restoring unit for decoding the encoded thumbnail image data read by the external thumbnail image reading control unit to form thumbnail image data of a bit map form; a print image selecting unit for selecting an image to be printed on the basis of the thumbnail image data from the external thumbnail image data restoring unit; a main image reading control unit for controlling the external media interface to read the encoded main image data corresponding to the image to be printed selected by the print image selecting unit from the external media; and a print control unit for controlling the printer by using the encoded main image data read by the main image reading control unit to print the image to be printed. Thus, a direct print can be realized that the encoded thumbnail image data is read from the external media and decoded, and then the image to be printed is selected on the basis of the decoded thumbnail image to read the encoded main image data of the selected image from the external media and print the selected image.

According to the present invention, in addition to the structure for the direct print, the control processing part includes: a plurality of image extracting unit for extracting data of an area corresponding to a plurality of images from the pre-scanned image data when the plurality of images are included in the original copy sheet to input the data to the encoded thumbnail image forming unit so that encoded thumbnail image data corresponding to the plurality of images is formed by the encoded thumbnail image forming unit; a thumbnail image storing unit for storing the encoded thumbnail image data corresponding to the plurality of images formed by the encoded thumbnail image forming unit; a plurality of thumbnail image data restoring unit for respectively decoding the encoded thumbnail image data corresponding to the plurality of the images in the thumbnail image storing unit by using the thumbnail image data restoring unit to form thumbnail image data of a bit map form corresponding to the plurality of images; and a stored image selecting unit for selecting an image to be stored in the external media on the basis of the thumbnail image data corresponding to the plurality of the images from the plurality of thumbnail image data restoring unit. The thumbnail image storage control unit selects only the encoded thumbnail image data corresponding to the image selected by the stored image selecting unit among the encoded thumbnail image data corresponding to the plurality of the images formed by the encoded thumbnail image forming unit and storing the encoded thumbnail image data in the external media. The main scanning control unit controls the image scanner to mainly scan only the image selected by the stored image selecting unit on the original copy sheet. Thus, when the plurality of images are read from the original copy having a plurality of images such as a photograph film strip to select an image desired to be stored in the external media on the basis of the thumbnail images of the plurality of the images, the decoding unit of the encoded thumbnail images used in the above-described direct print can be made use of.

An image processing method according to another aspect of the present invention comprises: a pre-scanning step of pre-scanning an original copy sheet to obtain pre-scanned image data of a bit map form with a predetermined low resolution; an encoded thumbnail image forming step of encoding the pre-scanned image data to obtain encoded thumbnail image data of a predetermined code form; a thumbnail image storing step of storing the encoded thumbnail image data in an external media; a main scanning step of mainly scanning the original copy sheet to obtain main image data of a bit map form with a predetermined high resolution; an encoded main image forming step of encoding the main image data to obtain encoded main image data of a predetermined code form; and a main image storing step of storing the encoded main image data in the external media.

An image processing method according to a still another aspect of the present invention comprises: a pre-scanning step of pre-scanning an original copy sheet to read pre-scanned image data with a predetermined low resolution; an encoded thumbnail image forming step of encoding the pre-scanned image data to form encoded thumbnail image data of a predetermined code form; a main scanning step of mainly scanning the original copy sheet to read main image data with a predetermined high resolution; an encoded main image forming step of encoding the main image data to form encoded main image data of a predetermined code form; and a step of forming a data file of a predetermined form including the encoded thumbnail image data and the encoded main image data.

In the present invention, the already read main image data of each part may be encoded and the data file may be formed on the basis of the already formed encoded main image data of each part in parallel with the main scanning operation of each part of the original copy sheet.

In the present invention, the image processing method may further include a step of deciding a main scanning area to be mainly scanned from the area of the original copy sheet on the basis of the pre-scanned image data to mainly scan the main scanning area of the original copy sheet.

In the present invention, the image processing method may further comprises a step of deciding a main scanning area to be mainly scanned from the area of the original copy sheet on the basis of the pre-scanned image data. In a main scanning operation, the main scanning area of the original copy sheet or all the areas of the original copy sheet may be read in accordance with a selection.

In the present invention, in the step of forming the data file, the encoded thumbnail image data and the encoded main image data may be stored in a storage device to form the data file in the storage device.

In the present invention, the image processing method may further comprises: an encoded thumbnail image data reading step of reading the encoded thumbnail image data from the data file; a thumbnail image data forming step of decoding the read encoded thumbnail image data to form thumbnail image data of a bit map form; an image selecting step of selecting an image to be printed on the basis of the thumbnail image data obtained by a decoding operation; a reading step of reading the encoded main image data corresponding to the image to be printed from the data file; and a printing step by using the read encoded main image data.

In the present invention, the image processing method may further comprises: a displaying step of displaying a preview image based on the pre-scanned image data and a determining step of determining one or two or more images to be stored by using the displayed preview image. Then, the main scanning operation may be carried out to read the main image data of the determined image from the original copy sheet. The encoded thumbnail image data may be formed for the determined image and the data file may be formed for the determined image.

In the present invention, the image processing method may further comprises a storing step of performing a predetermined process to the encoded thumbnail image data formed in the encoded thumbnail image data forming step when the aspect ratio of the image of the original copy sheet is different from an aspect ratio predetermined for the encoded thumbnail image data of the data file and storing the encoded thumbnail image data having the predetermined aspect ratio in the data file.

In the present invention, while the area of the image of the original copy sheet is incorporated in the area of an image based on the thumbnail image data having the predetermined aspect ratio and when two opposed sides of the image of the original copy sheet are arranged so as to be overlapped on two opposed sides of the image based on the thumbnail image, a process may be carried out for making up for a space area on the thumbnail image where the data of the image of the original copy sheet does not exist by a predetermined image and the encoded thumbnail image data that undergoes the above-described process may be stored in the data file.

In the present invention, the encoded thumbnail image data may be stored in the data file so that the direction of a long side of the encoded thumbnail image data of the data file corresponds to the direction of a long side of the image of the original copy sheet.

An image processing apparatus according to a still another aspect of the present invention comprises: an image scanner for reading an image from an original copy sheet; a storage device for storing image data; a pre-scanning control unit for controlling the image scanner to pre-scan the original copy sheet and output pre-scanned image data with a predetermined low resolution; an encoded thumbnail image forming unit for encoding the pre-scanned image data to form encoded thumbnail image data of a predetermined code form; a thumbnail image storage control unit for storing the encoded thumbnail image data in the storage device; a main scanning control unit for controlling the image scanner to mainly scan the original copy sheet and output main image data with a predetermined high resolution; an encoded main image forming unit for encoding the main image data to form encoded main image data of a predetermined code form; a main image storage control unit for storing the encoded main image data formed by the encoded main image forming unit in the storage device and a file forming unit for forming a data file of a predetermined form in which the encoded thumbnail image data and the encoded main image data can be stored.

According to the present invention, a capacity of a memory necessary for a process for converting the image read by the image scanner to the data of a predetermined form including a thumbnail image and a main image can be reduced.

Further, in the present invention, the image processing apparatus essentially has a structure including a display unit having a screen, a mode setting unit for setting a processing mode of the device and a display control unit for displaying at least one or more images on the display unit on the basis of fetched image data when an image to be processed under a mode is designated upon performing each processing mode set by the mode setting unit and displaying selecting information for designating the image on the display unit in a display form suitable for each mode.

According to this structure, the processing mode of the display device includes a plurality of modes and the processing mode is set to a predetermined mode by the mode setting unit in accordance with the operation of, for instance, an operating unit. Subsequently, to select and designate the image to be processed in the set mode, one or more images are displayed on the display unit by the display control unit. When the image to be processed is selected and operated from the images, the selecting information is displayed on the display unit by the display control unit. That is, when the image to be processed under the processing mode is designated, the display control unit displays the selecting information for designating the image in the display form suitable for each mode. Accordingly, the selecting information indicating the image designated as an object to be processed can be displayed in a state suitable for each mode. The screen for selecting the image can be displayed not only in one processing mode, but also in a plurality of processing modes.

In short, according to the present invention, the display control unit displays the selecting information on the image displayed on the screen.

According to this structure, the relation between the selecting information and the image can be made clear. Thus, which of the selecting information corresponds to any of the images can be immediately understood.

In the present invention, the mode setting unit sets the processing mode to at least two modes including a first mode for performing a first process to a selected image and a second mode for performing a second process to the selected image. When the processing mode is the first mode, the display control unit displays a representation for designating the number of sheets that undergoes the first process as the selecting information on the screen. When the processing mode is the second mode, the display control unit displays a representation for designating an object of the second process on the screen as the selecting information.

According to this structure, since at least the selecting information of the first mode and the selecting information of the second mode are displayed in the display forms respectively suitable for the modes, the image can be easily selected in both the first mode and the second mode.

In the present invention, the first mode is a printing mode for performing a printing process to the selected image as the first process. The second mode is a storing mode for performing a storing process to the selected image as the second process.

According to this structure, the selecting information of the printing mode and the selecting information of the storing mode are displayed in display forms respectively suitable for the modes. Accordingly, since the image can be selected while the image is viewed by the display unit not only in the printing mode, but also in the storing mode, the image can be readily selected both in the printing mode and the storing mode.

In the present invention, when the mode setting unit sets a specific processing mode among a plurality of processing modes, the display control unit displays processing conditions for the process as the selecting information for each image to be processed under the specific processing mode among a plurality of images displayed on the screen.

According to this structure, the processing conditions are displayed in the image designated as an object to be processed. Thus, when the image on the screen is viewed, the processing conditions related to the image can be immediately understood.

In the present invention, a designating unit is provided for designating at least one of a scanning unit that can scan an image and a reading unit that can read an image of a recording medium as a destination of fetching the image. The mode setting unit sets a mode of the processing modes under an operation mode in accordance with the fetching destination designated by the designating unit.

According to this structure, the selecting information indicating that the image is designated as an object to be processed can be displayed in states respectively suitable for the modes both when a scanned image is designated as an image to be processed and when a read image is designated as an image to be processed.

In the present invention, the device includes a selecting unit for selecting a predetermined image among displayed images on the screen and a pair of input units in which when one of them is operated, a numeric value on the screen is increased and when the other of them is operated, the numeric value on the screen is decreased. When the processing mode is the printing mode, if one side of the input units is operated for the image selected by the selecting unit, the display control unit increases the display of the numeric value of the number of print sheets as the selecting information. When the other side of the input units is operated, the display control unit decreases the display of the numeric value of the number of print sheets. When the processing mode is the storing mode, if one side of the input units is operated for the image selected by the selecting unit, a display for designating an object to be stored is given as the selecting information. When the other side of the input units is operated, the display for designating the object to be stored is erased.

According to this structure, the number of print sheets for each image under the printing mode is inputted and the image to be stored under the storing mode is set by using the same selecting unit or the input units. Accordingly, the selecting unit or the input units are shared in the printing mode and the storing mode. Thus, the number of parts, a cost and the size of the device can be more reduced than, for instance, a case in which the selecting unit or the input units are installed for each mode.

In the present invention, the device includes a total number of print sheet calculating unit for calculating the total number of print sheets of an image selected as an object to be printed and a remaining storage capacity calculating unit for calculating the remaining storage capacity of a storing medium on the basis of the data capacity of an image as an object to be stored and the total storage capacity of the storing medium when the image selected as the object to be stored is stored in the storing medium. When the processing mode is the printing mode, the display control unit displays the total number of print sheets calculated by the total number of print sheet calculating unit on the screen together with the selecting information. When the processing mode is the storing mode, the display control unit displays the remaining storage capacity of the storing medium calculated by the remaining storage capacity calculating unit on the screen together with the selecting information.

According to this structure, when the processing mode is the printing mode, the total number of print sheets of the image calculated by the total number of print sheet calculating unit of the image is displayed on the display unit. Thus, a user can recognize the total number of print sheets. Further, when the processing mode is the storing mode, the remaining storage capacity of the storing medium as a storage destination of the image is calculated by the remaining storage capacity calculating unit. A calculated value is displayed on the display unit as the remaining storage capacity. Accordingly, the user can recognize what quantity of image can be stored more in the storing medium.

In the present invention, the mode setting unit includes a printing, storing and executing unit by which a printing and storing mode that the image selected as the object to be printed is printed and stored in the storing medium can be performed as the processing mode as well as the printing mode and the string mode, and when the printing and storing mode is performed, the image selected as the object to be printed can be printed and outputted for the inputted and designated number of print sheets and each image as the object to be printed is stored in the storing medium one by one.

According to this structure, when the printing and storing mode is performed, the selected and designated image is printed and outputted and the image as the object to be printed is stored in a storing unit at the same time. Accordingly, when a printing operation is carried out, the image as the object to be printed is not only printed, but also stored. Thus, a utility is improved as the device.

In the present intention, the structure essentially includes an image selecting information display device defined in any one of claims, a reading unit capable of reading the image of the storing medium and a printing mechanism capable of printing and outputting the image data read by the reading unit to a printing medium.

In the present invention, the structure essentially includes the image selecting information display device defined in any one of claims, a scanning unit capable of scanning an image, the reading unit capable of reading the image of the storing medium and the printing mechanism capable of printing and outputting image data scanned by the scanning unit and the image data read by the reading unit to the printing medium.

The present invention relates to an image selecting information display method of the image selecting information display device including the display unit having the screen, the mode setting unit for setting the processing mode of the device and the display control unit for controlling the display of the screen of the display unit. At the time of performing each processing mode set by the mode setting unit, when the image to be processed in the mode is designated, the display control unit displays at least one or more images on the display unit on the basis of the fetched image data. Further, the display control unit displays the selecting information for designating the image on the display unit in the display form suitable for each mode.

BRIEF DESCRIPTION OF THE DRAWINGS

FIG. 8 is a diagram showing the examples of resolutions and quantize steps of main image data applied to a main scanning operation of a scan to memory process.

FIG. 23 is a flowchart showing an original copy image processing routine.

DETAILED DESCRIPTION OF PREFERRED EMBODIMENTS

Figure 1:
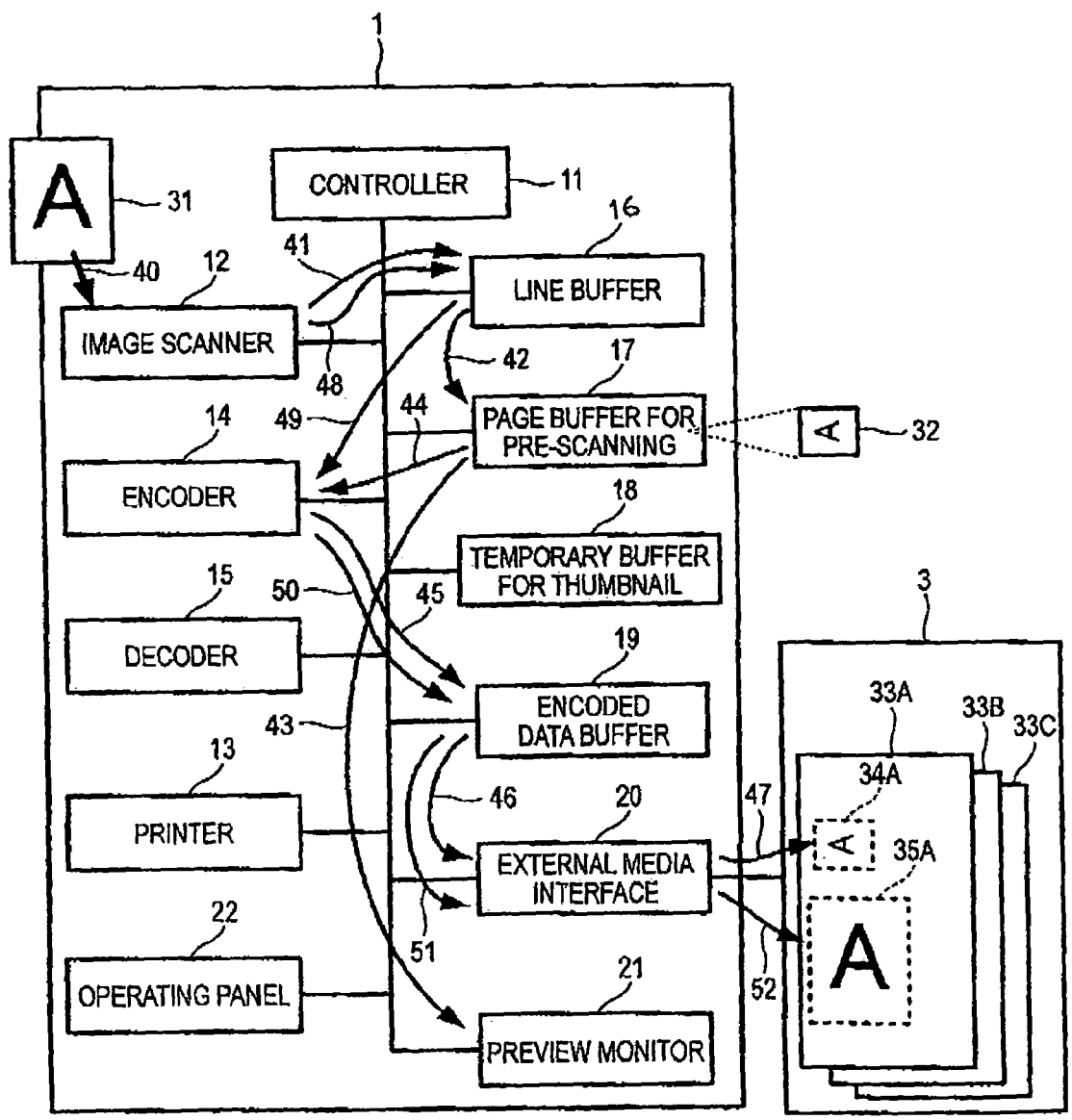
FIG. 1 is a diagram showing the structure of one embodiment of the present invention constructed as a multifunction printer apparatus and the flow of data when an individual scan-to-memory operation is carried out.

Now, an embodiment of the present invention will be described by referring to the drawings.

FIG. 1 shows the structure of an image processing apparatus according to one embodiment of the present invention constructed as a multifunction printer apparatus.

The multifunction printer apparatus 1 shown in FIG. 1 includes a controller 11 for controlling the entire part of the multifunction printer apparatus 1, an image scanner 12 for reading an image of an original copy and a printer 13 for outputting the hard copy of the image. The multifunction printer apparatus 1 can be connected to an external storing media 3 (typically, for instance, a memory card used in a digital still camera or a digital still camera or the like). Then, the multifunction printer apparatus 1 includes a function (refer this function or operation to as a direct print, hereinafter) for reading image data from the external storing media 3 and printing the image data by the printer 13 and a function (refer this function or operation to as a scan to memory, hereinafter) for storing the image data read by the image scanner 12 in the external storing media 3.

The image scanner 12 includes, as an operating mode when the image of an original copy sheet is read, a main scanning mode for reading the image of an area designated on the original copy sheet with a predetermined high resolution and a pre-scanning mode for reading the image of the entire area of the original copy sheet with a predetermined low resolution before the main scanning mode is performed to designate the area of the original copy by the main scanning operation. In the pre-scanning mode, the image data of a size extremely smaller than the image data obtained by the main scanning mode, for instance, the image of the original copy of an A4 size is read as the image data of the small size such as 150 dots×120 dots.

As shown in FIG. 1, the multifunction printer apparatus 1 further includes an encoder 14, a decoder 15, a line buffer 16, a page buffer 17 for pre-scanning, a temporary buffer 18 for a thumbnail, an external media I/F (an external media interface) 20, an encoded data buffer 19, a preview monitor 21 and an operating panel 22.

The encoder 14 compresses and converts the image data of a bit map form to encoded data of a predetermined form, for instance, the image data of a JPEG form. The decoder 15 expands and converts the encoded data of the predetermined form, for instance, the image data of the JPEG form to the original image data of the bit map form.

The line buffer 16 serves to temporarily store the image data for one line or for a plurality of predetermined number of lines outputted from the image scanner 12 when the image scanner 12 reads the image of the original copy. The page buffer 17 for pre-scanning serves to temporarily store the image data of a small size (for instance, 160 dots×120 dots) read by the pre-scanning operation of the image scanner 12. The temporary buffer 18 for a thumbnail serves to temporarily store the thumbnail image data of an image as an object when the direct print operation or the scan to memory operation is carried out. The encoded data buffer 19 serves to temporarily store a predetermined unit transfer amount of the encoded data (for instance, the data of the JPEG form) outputted from the encoder 14 when the scan to memory operation is carried out or a predetermined unit transfer amount of the encoded data (for instance, the data of the JPEG form) read from the external media 3 when the direct print operation is carried out.

The external media interface 20 is connected to the external media 3 to perform a communication of data between the external media 3 and the external media interface. The preview monitor 21 serves to display the image as an object and the thumbnail image thereof when the direct print operation or the scan to memory operation is carried out. The operating panel 22 serves to input a command from a user to the compound print device 1. The command that can be inputted from the operating panel 22 includes, for instance, a command for designating an area to be mainly scanned from the image of the original copy read by the pre-scanning operation, a command for designating an image to be scanned to memory and a command for designating an image to be directly printed or the like.

Now, the scar to memory operation and the direct print operation of the multifunction printer apparatus 1 will be described below.

The scan to memory operation carried out by the multifunction printer apparatus 1 includes at least two kinds. One kind of them is an operation for reading an image one by one from the original copy of a cut sheet and writing the image in the external media 3 (refer this operation to as an individual scan to memory, hereinafter). The other one kind is an operation for continuously reading a plurality of images from the original copy of a photograph film strip and writing the images in the external media 3 (refer this operation to as a continuous scan to memory, hereinafter). In the following explanation, both in the individual scan to memory and the continuous scan to memory, the image data is stored in the external media 3 in the form of the EXIF file. However, the form of the EXIF file simply shows an example. It is to be easily understood from a below stated description that the principle of the present invention may be applied to the use of other form.

Figure 2:
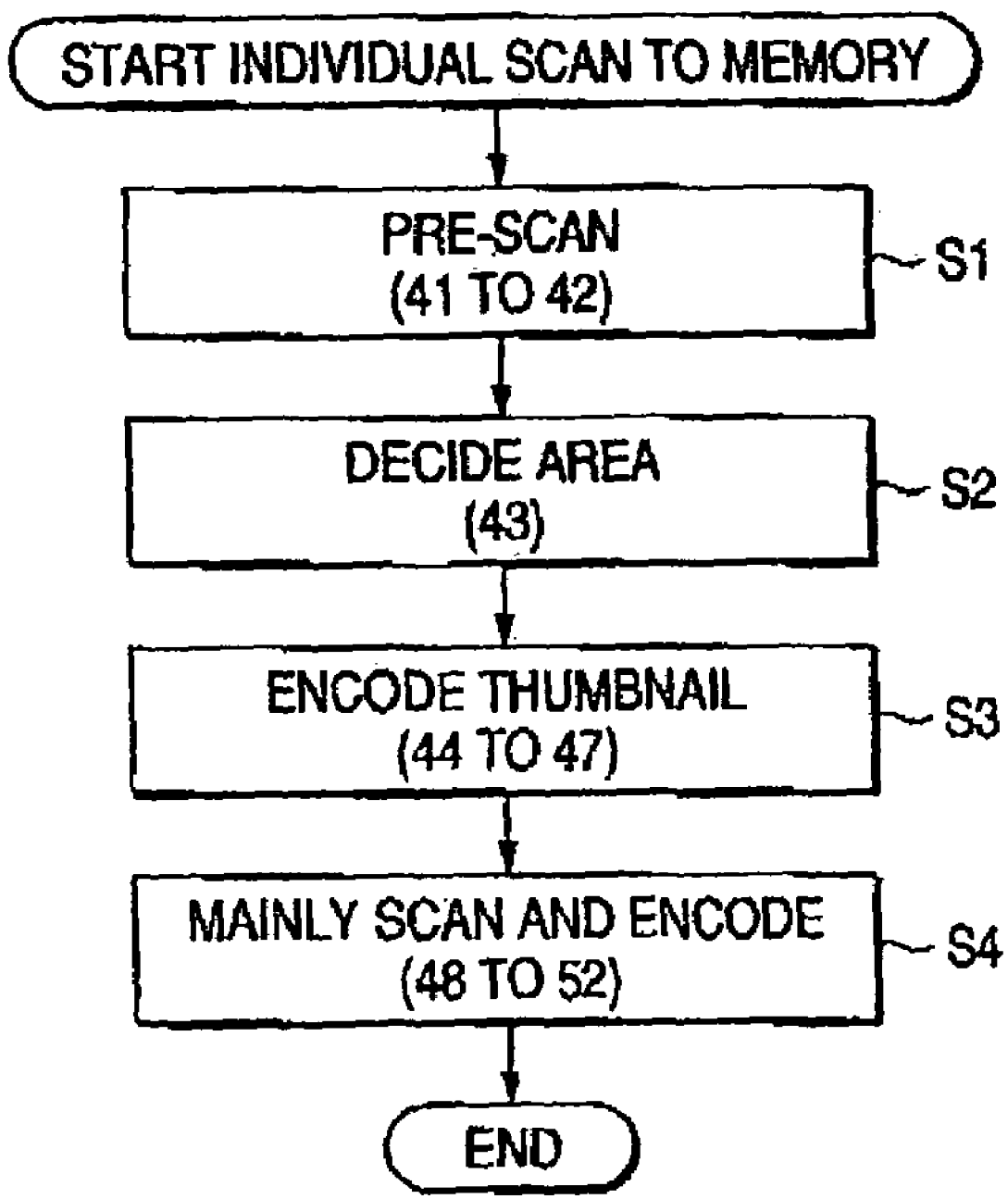
FIG. 2 is a diagram showing the flow of a control of the individual scan-to-memory operation by a controller 11 of the multifunction printer apparatus 1.

Firstly, referring to FIGS. 1 and 2, the individual scan to memory operation will be described. In FIG. 1, the flow of data when the individual scan to memory operation is carried out is shown. In FIG. 2, the flow of a control of the individual scan to memory operation by the controller 11 is shown.

When the individual scan to memory operation is performed, the user connects the external storing media 3 to the external media I/F 20, sets an original copy sheet 31 of a cut sheet to the image scanner 12 and then inputs a start command of the individual scan to memory operation from the operating panel 22. Then, the controller 11 performs a control in accordance with a procedure shown in FIG. 2.

As shown in FIG. 2, the image scanner 12 pre-scans the image of the original copy under the control of the controller 11 (step S1). In the pre-scanning operation, the image data flows as shown by arrow marks 41 to 42 in FIG. 1. That is, the image scanner 12 successively reads the image of an entire area of the original copy sheet 31 one line by one line with a predetermined low resolution and outputs the image to write the image data of one line successively outputted in the line buffer 16 (41). The image data of one line written in the line buffer 16 is immediately transferred and accumulated in the page buffer 17 for pre-scanning (42). When the pre-scanning operation by the image scanner 12 is finished, image data 32 with a bit map form of the entire part of the image of the original copy read by the pre-scanning operation is stored in the page buffer 17 for pre-scanning. The data size of the image data 32 is small. For instance, when the original copy is A4 size, the size of the image data 32 is 160 dots×120 dots. The image data 32 is referred to as pre-scanned image data, hereinafter.

When the pre-scanning operation is completed, as shown in FIG. 2, a process is performed for deciding an area to be mainly scanned from the image of the original copy read by the pre-scanning operation (S2). This area deciding process can be automatically carried out, or carried out by a manual operation of the user. When the area is automatically decided, the controller 11 examines the pre-scanned image data 32 in the page buffer 17 for pre-scanning to detect a part apparently recognized to be a space and remove this part. Thus, the area to be mainly scanned is selected. On the other hand, when the area is decided by the manual operation of the user, as shown by an arrow mark 43 in FIG. 1, the pre-scanned image data 32 in the page buffer 17 for pre-scanning is supplied to and displayed on the preview monitor 21. The user operates the operating panel 22 to select and instruct the area to be mainly scanned on the displayed pre-scanned image data 32. In this case, a selective area mode in which only a main scanning area decided in the area deciding process is mainly scanned and a maximum area mode in which the area deciding process is omitted to mainly scan all the area of the original copy sheet can be selected automatically or in accordance with a command from the user. However, in the following description, only an operation in the case of the selective area mode will be explained. The operation of the maximum area mode is basically the same as that of the selective area mode except the difference of an area to be mainly scanned. Accordingly an explanation thereof is omitted.

When the above-described area selecting process is finished, as shown in FIG. 2, a process for encoding a thumbnail image to be inputted to the EXIF file to the JPEG form is carried out under the control of the controller 11 (S3). In the thumbnail encoding process, data flows as shown by arrow marks 44 to 47 in FIG. 1. That is, the encoder 14 reads the pre-scanned image data 32 from the page buffer 17 for pre-scanning (44). At this time, the encoder 14 selects and reads the image data part of the area designated by the above-described area decision (S2) from the pre-scanned image data 32. The encoder 14 finely divides the read data part into small areas of predetermined size, sequentially encodes the small areas to the JPEG form and writes each predetermined unit transfer amount of the encoded data of each of the successively obtained small areas in the encoded data buffer 19 (45). The unit transfer amount of the encoded data written in the encoded data buffer 19 is immediately read by the external media I/F (46) as soon as the encoded data is written in the encoded data buffer and written in the external media 3 (47) from the external media I/F 20. When the encoded data is written in the external media (3) (47), the external media X/F 20 newly forms a file 33A of the EXIF form in the external storing media 3 (reference numerals 33B and 33C of the external storing media 3 designate an already stored other image and the EXIF file of an image photographed by a digital still camera.). The external media I/F 20 writes the encoded data from the encoded data buffer 19 in the EXIF file 33A as the component data of thumbnail image data 34A. Accordingly, when the encoding process in the encoder 14 is finished and the last encoded data is written in the EXIF file 33A, the thumbnail image data 34A of the JPEG form converted from the pre-scanned image data 32 is completed in the EXIF file 33A. In FIG. 1, the reference numerals 33B and 33C in the external storing media 3 show the EXIF files of other images (for instance, images photographed by the digital still camera) previously stored in the external storing media 3. Further, in the drawing, image data shown by a full line block indicates the image data of a bit map form and image data shown by a dotted line indicates the image data of the JPEG form.

When the thumbnail encoding process is finished, as shown in FIG. 2, a main scanning process and an encoding process of a main image read by the main scanning process are carried out (S4). In the main scanning process and the encoding process, data flows as shown by arrow marks 48 to 52 in FIG. 1. That is, the image scanner 12 starts the main scanning process to successively read the image of the area designated on the original copy sheet 31 by predetermined high resolution and output the image. The image data of one line successively outputted is supplied to the encoder 14 via the line buffer 16 (48,49). The image data read by the main scanning process is referred to as main image data. The main image data is read with the high resolution of, for instance, 300 dpi and the data size of the entire image is ordinarily megabyte order or more. The main image data has a quantity of data greatly more than that of the pre-scanned data 32. Every time the main image data successively inputted one line by one is stored for a predetermined small area, the encoder 14 encodes the main image data to the JPEG form. The encoder 14 writes each predetermined unit transfer amount of the encoded data of each small area successively obtained in such a way in the encoded data buffer 19 (50). The unit transfer amount of the encoded data written in the encoded data buffer 19 is immediately read by the is written in the encoded data buffer and written in the external storing media 3 (52) from the external media I/F 20. When the encoded data is written in the external data from the encoded data buffer 19 in the EXIF file 33A in the external storing media 3 as the component data of main image data 35A. Accordingly, when the main scanning process by the image scanner 12 and the encoding process by the encoder 14 are finished and the last encoded data is written in the EXIT file 33A, the main image data 35A of the JPEG form converted from the main image data of a bit map form with the high resolution read by the 33A.

As described above, in the scan to memory operation, the thumbnail image data 34A of the JPEG form of the EXIF file 33A stored in the external storing media 3 is formed on the basis of the pre-scanned data of the small size for deciding the area read by the pre-scanning operation. Further, in the main scanning operation, the image data of the part read in parallel with the reading operation of each part of the image of the original copy is encoded and the encoded data is transferred to the external storing media 3. Accordingly, all of the main image data having the large data size read by the main scanning operation is not stored and held in the multifunction printer apparatus 1. As a result, the capacity of the memory of the multifunction printer apparatus 1 may be decreased.

Figure 9:
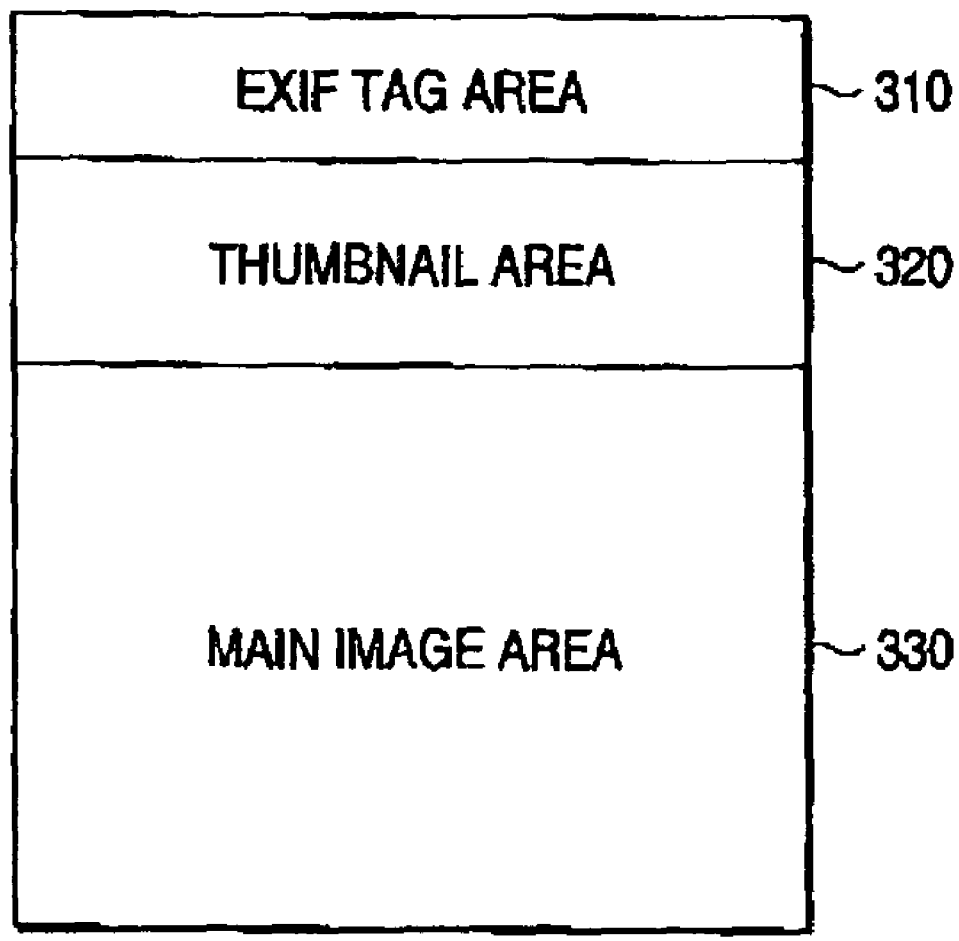
FIG. 9 shows an example of EXIF file format.

A format of the EXIF file will be described hereinafter. As shown in FIG. 9, for example, the EXIF file format 300 comprises a EXIF tag region 310, a thumbnail region 320 for storing thumbnail image data, and a main image region 330 for storing main imge data.

For example, information on thumbnail, information on a main image (size of the main image, a start address of the main image region, etc.) and other information (color space, file creating data, etc.) are stored in the EXIF tag region 310. Since the information on the main image can be determined from information obtained by pre-scanning, said information can be written at the time after performing pre-scanning.

Thus, in writing after pre-scanning, that is, writing in the above (47), the writing is performed to the EXIF tag region 310 and the thumbnail region 320. For the main image region 330, the writing (the writing in the above (52) is performed during the main scanning is performed.

Figure 3:
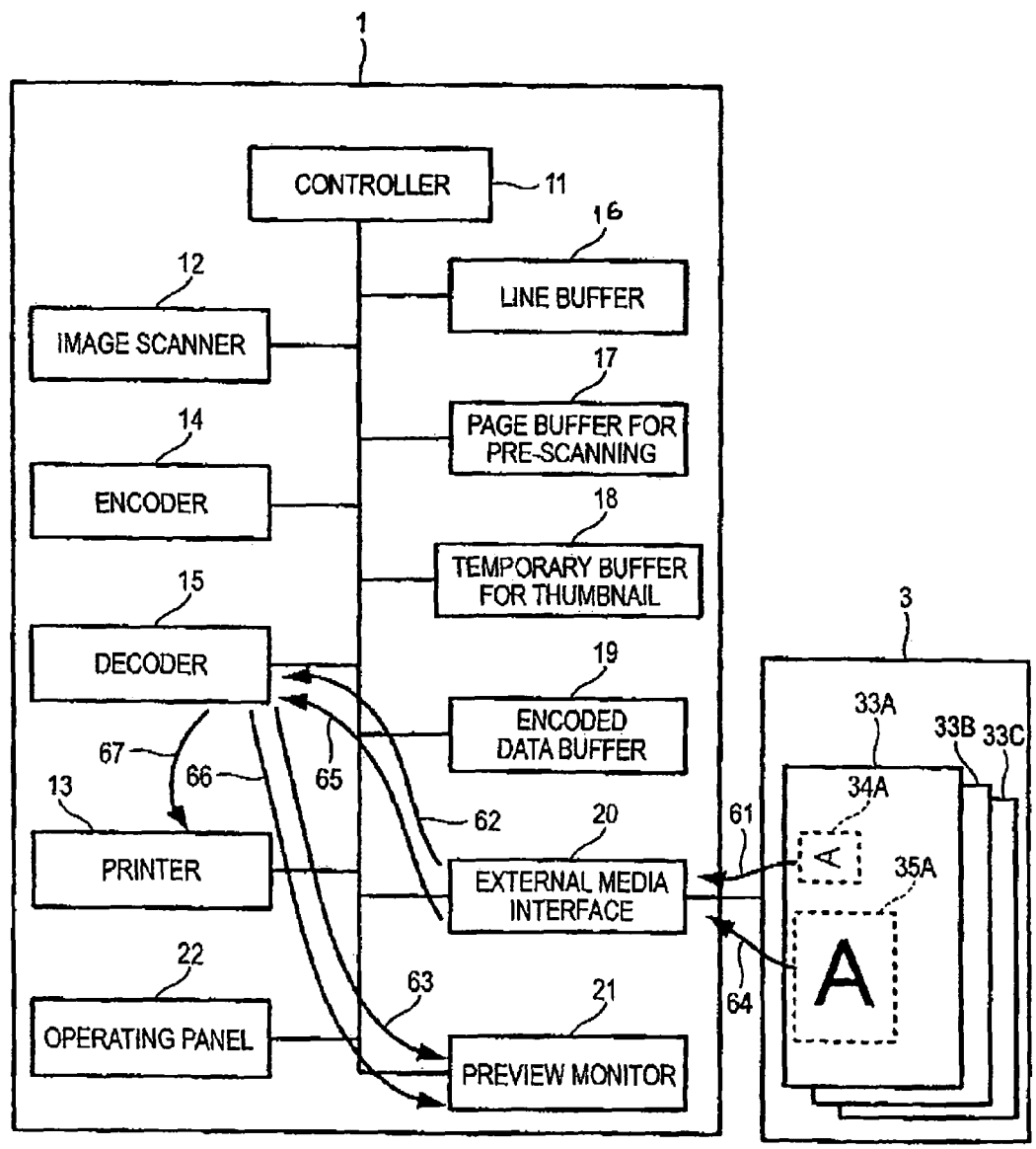
FIG. 3 is a diagram showing the flow of data when a direct print operation is carried out.
Figure 4:
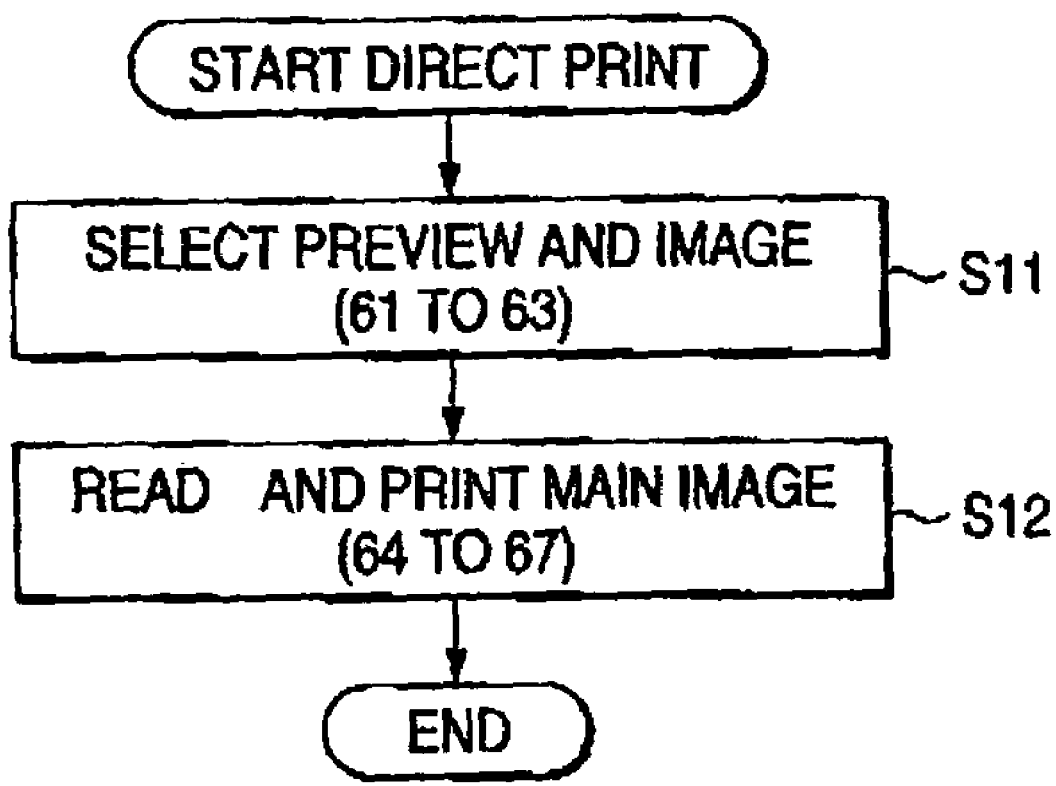
FIG. 4 is a diagram showing the flow of data of the direct print operation by the controller 11 of the multifunction printer apparatus 1.

Now, referring to FIGS. 3 and 4, the direct print operation will be described below. In FIG. 3, the flow of data when the direct print operation is carried out is shown. In FIG. 4, the flow of the control of the direct print operation by the controller 11 is shown.

When the direct print operation is carried out, the user connects the external storing media 3 to the external media I/E 20 to input a start command of the direct print operation from the operating panel 22. Then, the controller 11 performs a control in accordance with a procedure shown in FIG. 4.

As shown in FIG. 4, a process for selecting a preview and an image is carried out (step S11) under the control of the controller 11. In this process, image data flows as shown by arrow marks 61 to 63 in FIG. 3. That is, the external media I/F 20 sequentially and successively reads (61) each predetermined unit transfer amount of the JPEG thumbnail image data 34A ... from the plurality of EXIF files 33A, 33B, 33C ... stored in the external storing media 3 and supplies the unit transfer amount of the successively read JPEG thumbnail image data 34A ... to the decoder 15 (62). The decoder 15 successively decodes the inputted JPEG thumbnail image data 34A ... in order of input to sequentially restore a plurality of original thumbnail images of a bit map form and sends the restored image plurality of thumbnail images stored in the external storing media 3 are displayed on the preview monitor 21. The user selects one or more images to be printed among the plurality of thumbnail images displayed on the preview monitor 21 by using the operating panel 22.

When the process for selecting the preview and the image is finished, as shown in FIG. 4, a process for reading and printing a main image is carried out (step S12) under the control of the controller 11. In this process, image data flows as shown by arrow marks 64 to 67 in FIG. 3. That is, the external media I/F 20 successively reads (64) each unit transfer amount of the JPEG main image data 35A of the EXIF file (as one example, the EXIF file 33A) of the image to be printed selected by the user and sends the unit transfer amount of the successively read decoder 15 successively decodes the inputted JPEG main image data 35A in order of input to gradually restore the main image data of the original bit map form and transfers the restored main image data to the printer original bit map form is stored by a predetermined amount necessary for starting a printing process, the printer 13 starts the printing process of the main image. To designate a range to be printed by trimming the main image on the preview monitor 21 by the user before the main image is printed, as shown by an arrow mark 66 in FIG. 3, the main image of the original bit map form outputted from the decoder 15 may be sent to and displayed on the preview monitor 21 before the main image data is transferred to the printer 13 (67).

Figure 5:
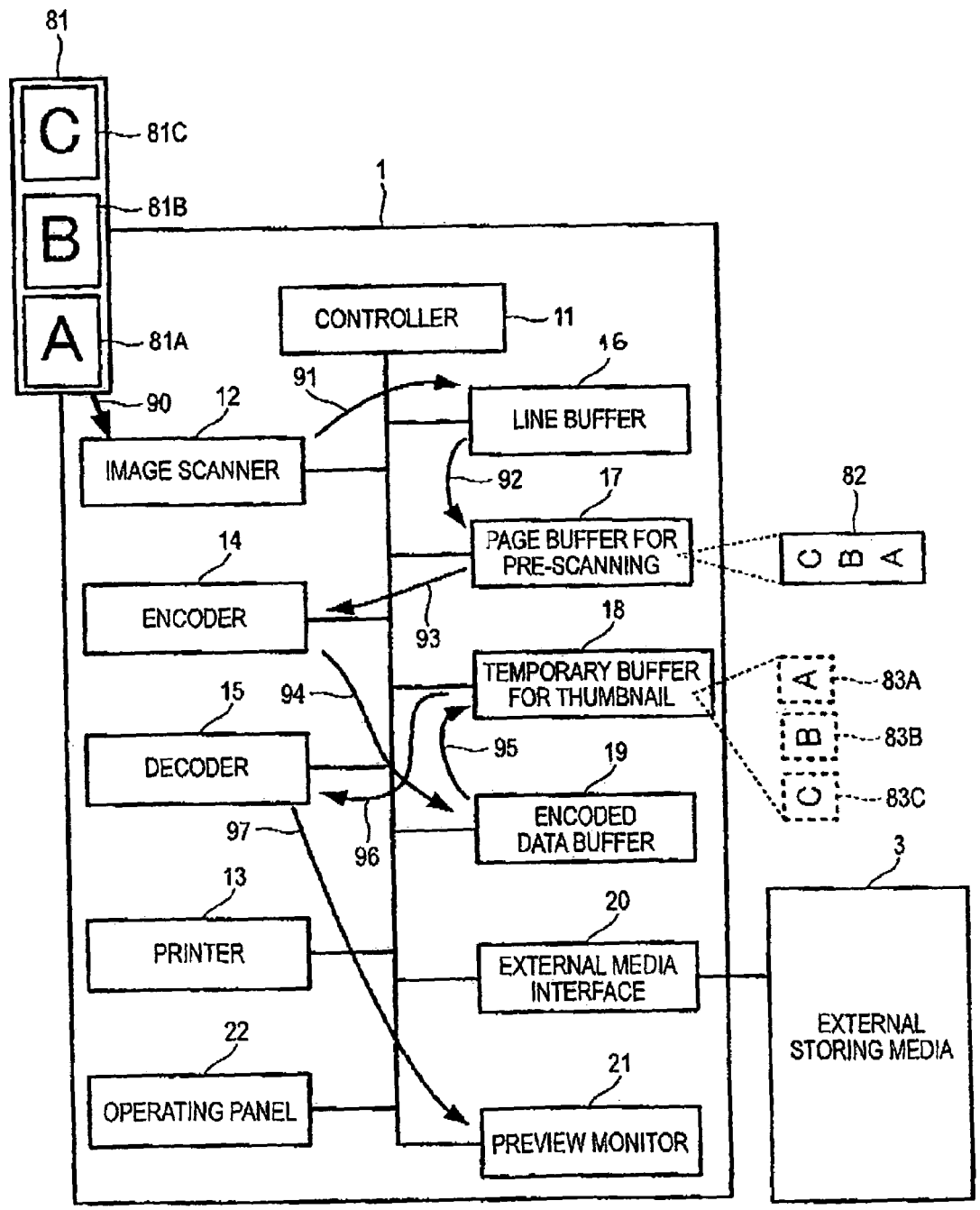
FIG. 5 is a diagram showing the flow of data when a continuous scan-to-memory operation is carried out.
Figure 6:
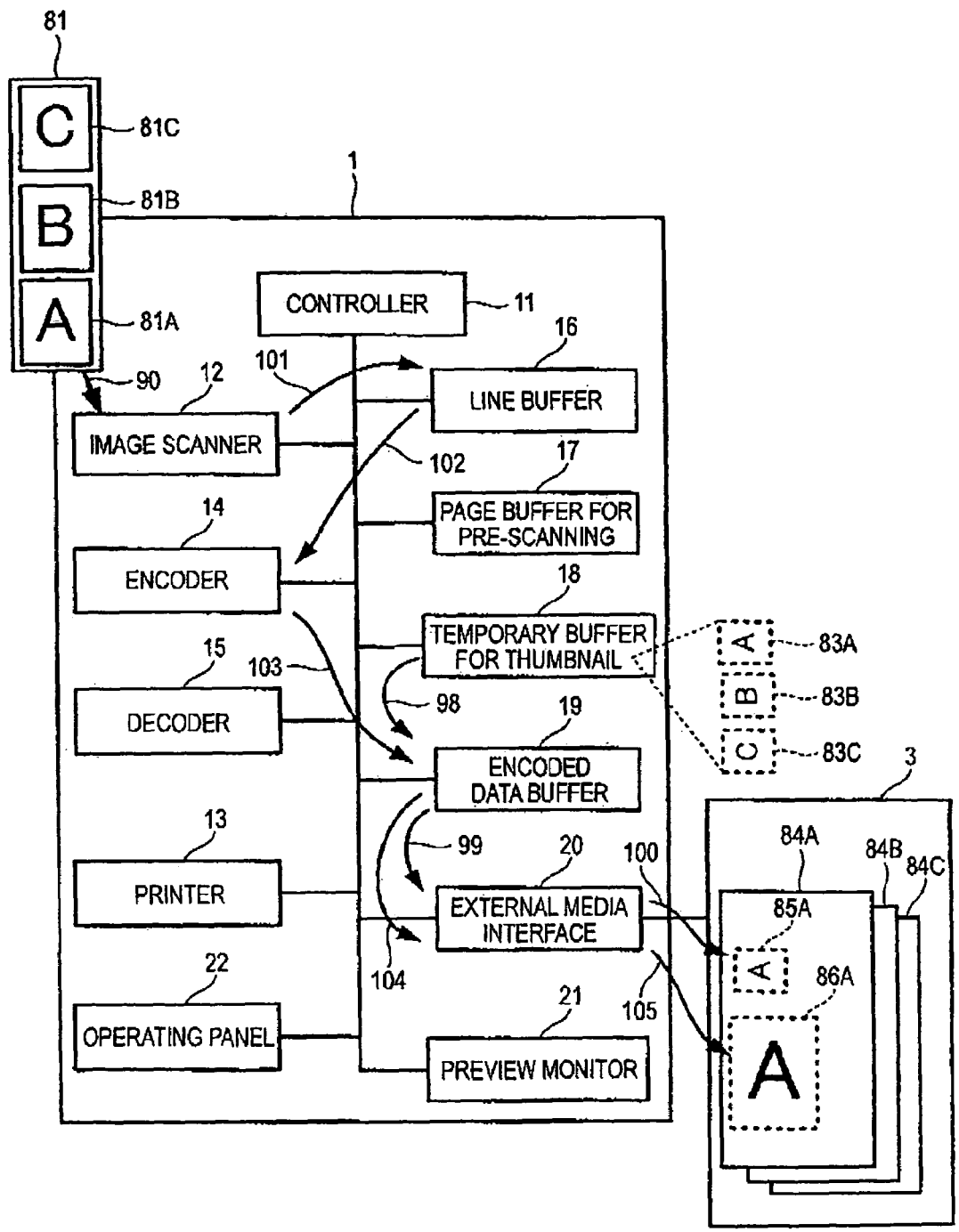
FIG. 6 is a diagram showing the flow of data when the continuous scan-to-memory operation is carried out.
Figure 7:
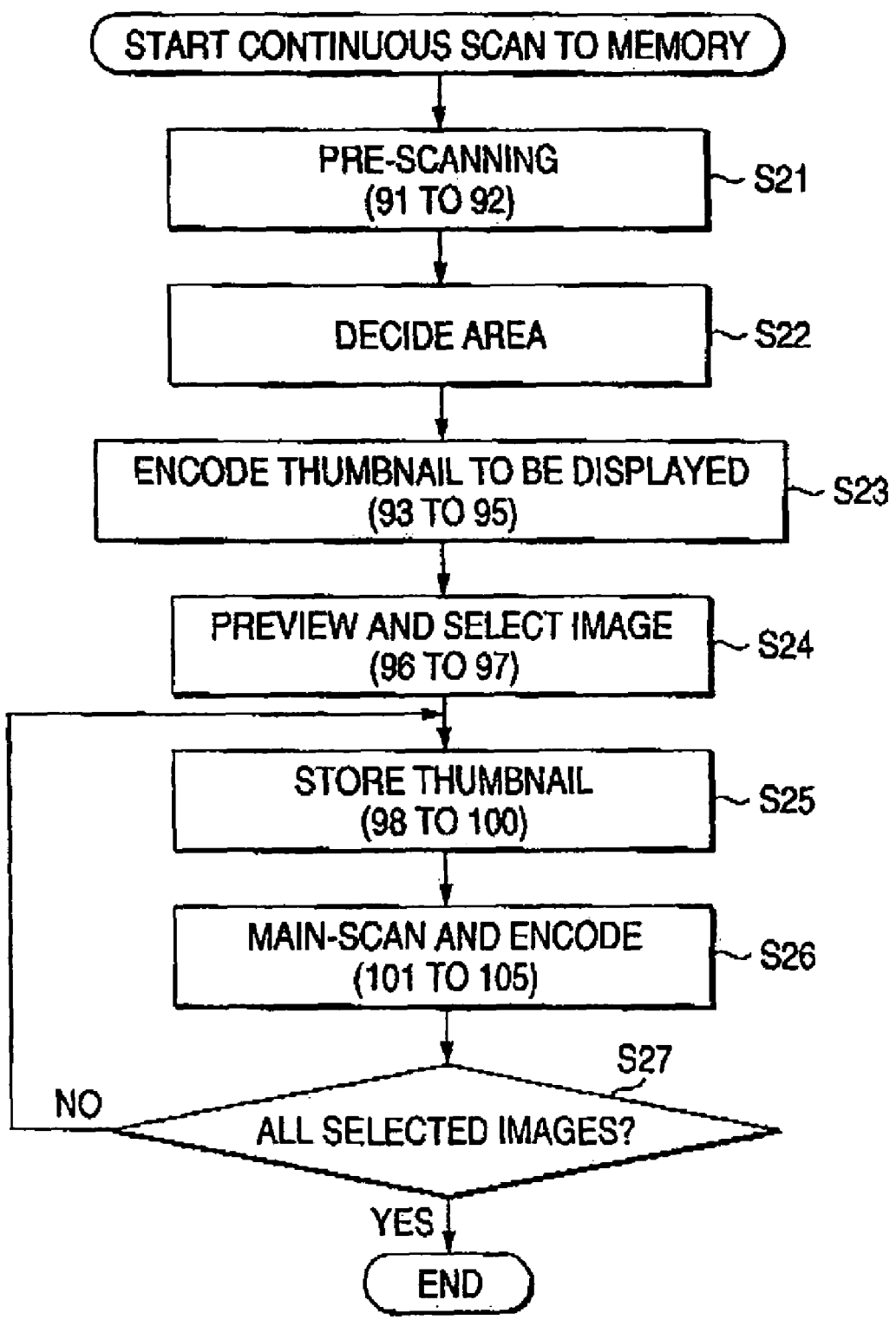
FIG. 7 is a diagram showing the flow of a control of the continuous scan-to-memory operation by the controller 11 of the multifunction printer apparatus 1.

Now, the operation of a continuous scan to memory will be described by referring to FIGS. 5 to 7. FIGS. 5 and 6 show the flow of data when the continuous scan to memory operation is carried out. FIG. 7 shows the flow of the control of the continuous scan to memory by the controller 11.

As shown in FIG. 5, when the continuous scan to memory operation is carried out, the user connects the external storing media 3 to the external media I/F 20 to set an original copy sheet 81 having a plurality of images 81A, 81B and SIC like a photograph film strip to the image memory from an operating panel 22. Then, the controller 11 performs a control in accordance with a procedure shown in FIG. 7.

As shown in FIG. 7, the image scanner 12 pre-scans the original copy sheet 81 under the control of the controller 11 (step S21). In the pre-scanning operation, the image data flows as shown by arrow marks 91 to 92 in FIG. 5. That is, the image scanner 12 successively reads the image of an entire area of the original copy sheet 81 one line by one line with a predetermined low resolution and outputs the image to write the image data of one line successively outputted in the line buffer 16 (91). The image data of one line written in the line buffer 16 is immediately transferred and accumulated in the page buffer 17 for pre-scanning (92). When the pre-scanning operation by the image scanner 12 is finished, pre-scanned image data 82 with a bit map form of the entire area of the original copy sheet 81 read by the pre-scanning operation is stored in the page buffer 17 for pre-scanning. As described above, the data size of the pre-scanned image data 32 is smaller than the main image data read by the main scanning operation.

When the pre-scanning operation is completed, as shown in FIG. 7, a process is performed for deciding an area to be mainly scanned from the images of the original copy read by the pre-scanning operation (S22). This area deciding process is ordinarily automatically carried out when the original copy sheet 81 is the photographic film strip. That is, the controller 11 examines the pre-scanned image data 82 in the page buffer 17 for pre-scanning to respectively detect the areas of the plurality of images 81A, 81B and 81C of the original copy therefrom and select them as the areas to be mainly scanned. The area deciding process may be carried out by the manual operation of the user. When the area decision is performed by the manual operation, as already described by referring to FIG. 1, the pre-scanned image data 82 is sent to and displayed on the preview monitor 21. Then, the user operates the operating panel 22 to select and instruct the areas of the images 81A, 81B and 81C of the original copy as the areas to be mainly scanned from the displayed pre-scanned image data 32.

When the above-described area selecting process is finished, as shown in FIG. 7, a process for encoding a thumbnail image to be displayed to the JPEG form is carried out under the control of the controller 11 (S23). In the encoding process of the thumbnail to be displayed, data flows as shown by arrow marks 93 to 95 in FIG. 5. That is, the encoder 14 reads the pre-scanned image data 82 time, the encoder 14 selects and sequentially reads the image data parts corresponding respectively to the plurality of images 81A, 81B and 81C of the original copy designated by the above-described area decision (S22) from the pre-scanned image data 82. The encoder 14 finely divides the read image data parts respectively corresponding to the images 81A, 81B and 81C of the original copy into small areas of predetermined size, sequentially encodes the small areas to the JPEG forms and writes each predetermined unit transfer amount of the encoded data of each of the successively obtained small areas in the of the encoded data written in the encoded data buffer 19 is immediately transferred to and accumulated in the temporary buffer 18 for the thumbnail (95) as soon as the encoded data is written in the encoded data buffer. When the encoding process of the thumbnail to be displayed is finished, the plurality of JPEG thumbnail image data 83A, 83B and 83C respectively converted from the pre-scanned data of the plurality of images 81A, 81B and 81C of the original copy are stored in the temporary buffer 18 for the thumbnail.

When the above-described encoding process of the thumbnail to be displayed is finished, as shown in FIG. 7, a process for selecting a preview and an image is carried out under the control of the controller 11 (S24). In this process, as shown by arrow marks 96 to 97 in FIG. 5, image data flows. That is, the decoder 15 sequentially reads the plurality of the JPEG thumbnail image data 83A, 83B restore the thumbnail image data of the original bit map form and sends the restored thumbnail image data to the preview monitor 21 (97). As a result, the plurality of the thumbnail images on the original copy sheet 81 are displayed on the preview monitor 21. The user selects one or more images desired to be stored in the external storing media 3 from the plurality of the thumbnail images displayed on the preview monitor 21 by using the operating panel 22 to decide the selected image as an image to be stored.

When the flow of data 96 to 97 for selecting the preview and the image is compared with the flow of data 61 to 63 for selecting the preview and the image in the direct print operation already described with reference to FIG. 3, they are common to each other in view of an image processing operation that the JPEG thumbnail image data is decoded and displayed except a difference that a data source is the temporary buffer 18 for the thumbnail or the external storing media 3. Accordingly, an image processing function for selecting the preview and the image used in the existing direct print process can be advantageously made use of in the process for selecting the preview and the image of the continuous scan to memory operation.

Incidentally, the functions of preview and image selection may be provided for individual scan-to-memory. In this case, a user is asked to confirm whether the image read by the pre-scanning should be saved in the external storing media 3 or not, and an input for confirmation of the save is received.

When the process for selecting the preview and the image is finished, as shown in FIG. 7, a process for storing the selected JPEG thumbnail image in the external storing media 3 is carried out under the control of the controller 11 (S25). In this process, as shown by arrow marks 98 to 100 in FIG. 6, image data flows. That is, only the image data selected by the user in the process (S24) for selecting the preview and the image is sequentially sent to the external media I/F 20 via the encoded data buffer 19 among the plurality of the JPEG thumbnail image data 83A, 83B and 83C stored in the temporary buffer 18 for the thumbnail (98, 99) and written in the external storing media 3 from the external media I/F 20 (100). When the external medial I/F 20 writes the received JPEG thumbnail image data (for instance, 83A) in the external storing media 3 (100), the external media I/F 20 newly forms a file 84A of the EXIF form to write the received JPEG thumbnail image data 83A in the EXIF file 84A as JPEG thumbnail image data 85A.

When the thumbnail storing process is finished, as shown in FIG. 7, a main scanning process and an encoding process of a main image read by the main scanning process (S26). In the main scanning and encoding process, as shown by arrow marks 101 to 105 in FIG. 6, data flows. That is, each (for instance 81A) of the images of the original copy on the original copy sheet 81 that is designated in the image selecting process (S24) is read with a high resolution by the image scanner 12 by the substantially same method as the main scanning and encoding process upon individual scan to memory operation already described by referring to FIG. 1. The read image is encoded to the JPEG form and written in a corresponding EXIF file 86A in the external storing media 3 as JPEG main image data 86A.

When the main scanning and encoding process of the one selected image of the original copy is finished, as shown in FIG. 7, the above-described thumbnail storing process (S25) and the main scanning and encoding process (S26) are performed for the one selected image of the original copy. The processes are repeated. As a result, all selected images of the original copy are stored in the external storing media 3 in the EXIF forms. After that, the images can be treated similarly to an image photographed by the digital still camera (for instance, the direct print operation described by referring to FIG. 3 is carried out).

As described above, in the continuous scan to memory operation as in the case of the individual scan to memory operation, since all of the main image data having a large data size read by the main scanning process is not stored and held in the multifunction printer apparatus 1, the capacity of the memory of the multifunction printer apparatus 1 may be decreased. Further, in the continuous scan to memory operation, the image data of the small size read by the pre-scanning operation is converted to the thumbnail image data of the JPEG form, the JPEG thumbnail image data is stored in the multifunction printer apparatus 1 and the JPEG image data is used to select the preview and the image. Accordingly, the image processing function the same as the process for selecting the preview and the image using the JPEG thumbnail image data in the EXIF file upon direct print operation can be made use of.

FIG. 8 shows examples of the resolutions and the quantize steps of the main image data applied to the main scanning operation when the scan to memory operation is carried out.

As shown in FIG. 8, the resolution and the quantize step of the main scanning operation can be automatically controlled to optimum values in accordance with the kind of the image of an original copy and the quality of the image that can be designated from the operating panel 22 by the user. For instance, when the kind of the image of the original copy designated by the user is a text and the quality of the image designated by the user is normal, the resolution is automatically controlled to a predetermined low value of 200 dpi. The resolution is automatically controlled to a predetermined high resolution of 300 dpi in other cases than the above-described case. Further, for instance, when the kind of the image of the original copy designated by the user is graphic and the quality of the image designated by the user is fine, the quantize step is automatically controlled to a predetermined fine step. The quantize step is automatically controlled to a predetermined rough step in other cases than the above-described case. By such an automatic control of the resolution and the quantize step, the data size of an image data file such as the EXIF file stored in the external storing media 3 by the scan to memory operation is automatically controlled to a proper size.

Next, a storage mode of thumbnail image date to the EXIF file will be described. Since, a storage mode for the individual scan to memory and a storage mode for the continuous scan to memory are in common, the case of the continuous scan to memory will be described as an example.

Figure 10:
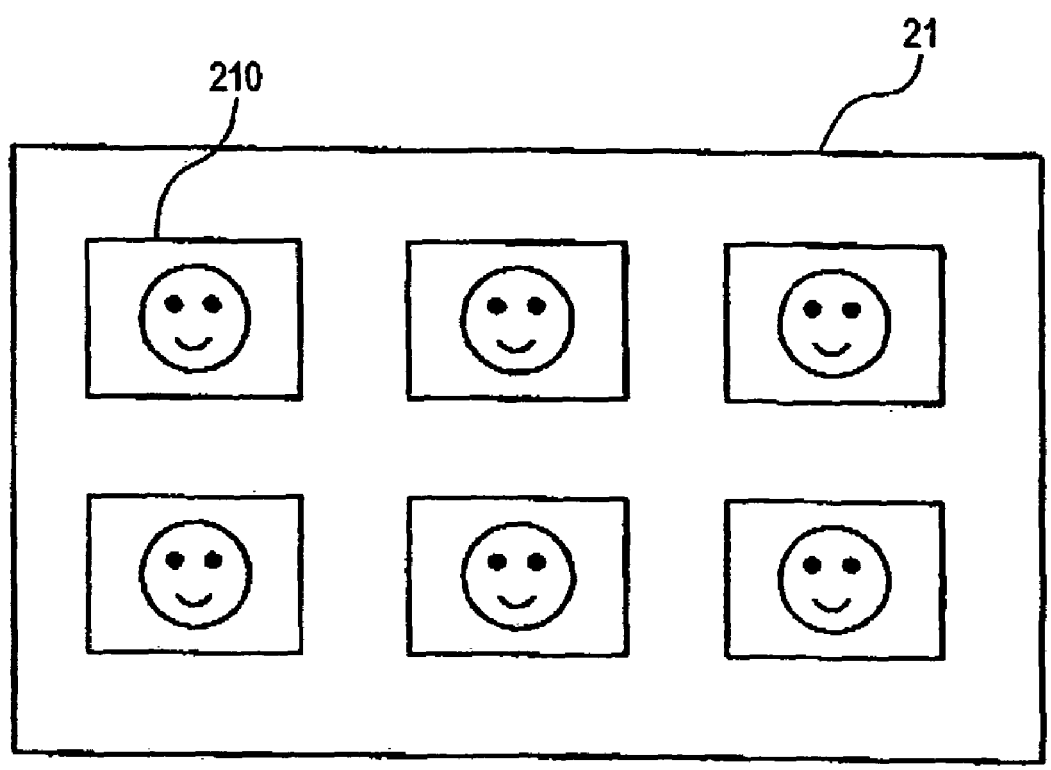
FIG. 10 shows an example when thumbnail images are displayed on a preview monitor 21.

IN the EXIF file 84A, a thumbnail image of 160×120 pixels is stored in a region for storing a thumbnail image data 85A. That is, in the following description, a vertical-to-horizontal aspect ratio which is 4:3 is called a thumbnail frame. When the preview is displayed on the preview monitor 21 using the thumbnail image data 85A, as shown in FIG. 10, each thumbnail image 210 are displayed as a horizontally long image (only one of reference numbers 210 is shown in drawing and others are omitted). Although the plural thumbnail images are displayed in FIG. 10, single thumbnail image may be displayed on the preview monitor 21 so as to be fitted to the display frame. In this case, since an aspect ratio of the preview monitor 21 is also 4:3, the thumbnail image represented by the thumbnail data 85A can be displayed on the preview monitor with few pauses.

Incidentally, it is not always true that the aspect ratio of the images 81A, 81B and 81C of the original copy sheet, which are objects to be scan to memory is 4:3. Alternatively, although the aspect ratio of the images 81A, 81B and 81C is 4:3, it is not always true that an aspect ratio of a region of the image to be stored as the thumbnail image in the EXIF file, which is designated manually by the user or automatically, is 4:3. Thus, in the multifunction printer apparatus according to the first embodiment, the aspect ratio of the thumbnail image data is adjusted and the data are stored in the EXIF file. The detailed description will be made with reference to FIGS. 6, 11 to 13 hereinafter.

As shown in FIG. 6, JEPG thumbnail image data 83 (83A, 83B and 83C), a region of which is designated by a region deciding processing (S22), are stored in the thumbnail temporary buffer 18. In the area deciding processing of S22, a region of the image 81 (81A, 81B, and 81C) are detected manually or automatically. In the case that an aspect ratio of the detected image area (referred as thumbnail image area hereinafter) is not 4:3, in the region deciding processing of S22, an image having an aspect ratio of 4:3 is generated by performing the processing described below and then is converted into JPEG thumbnail image data 83. One of examples of the processing procedure will be described.

Figure 11:
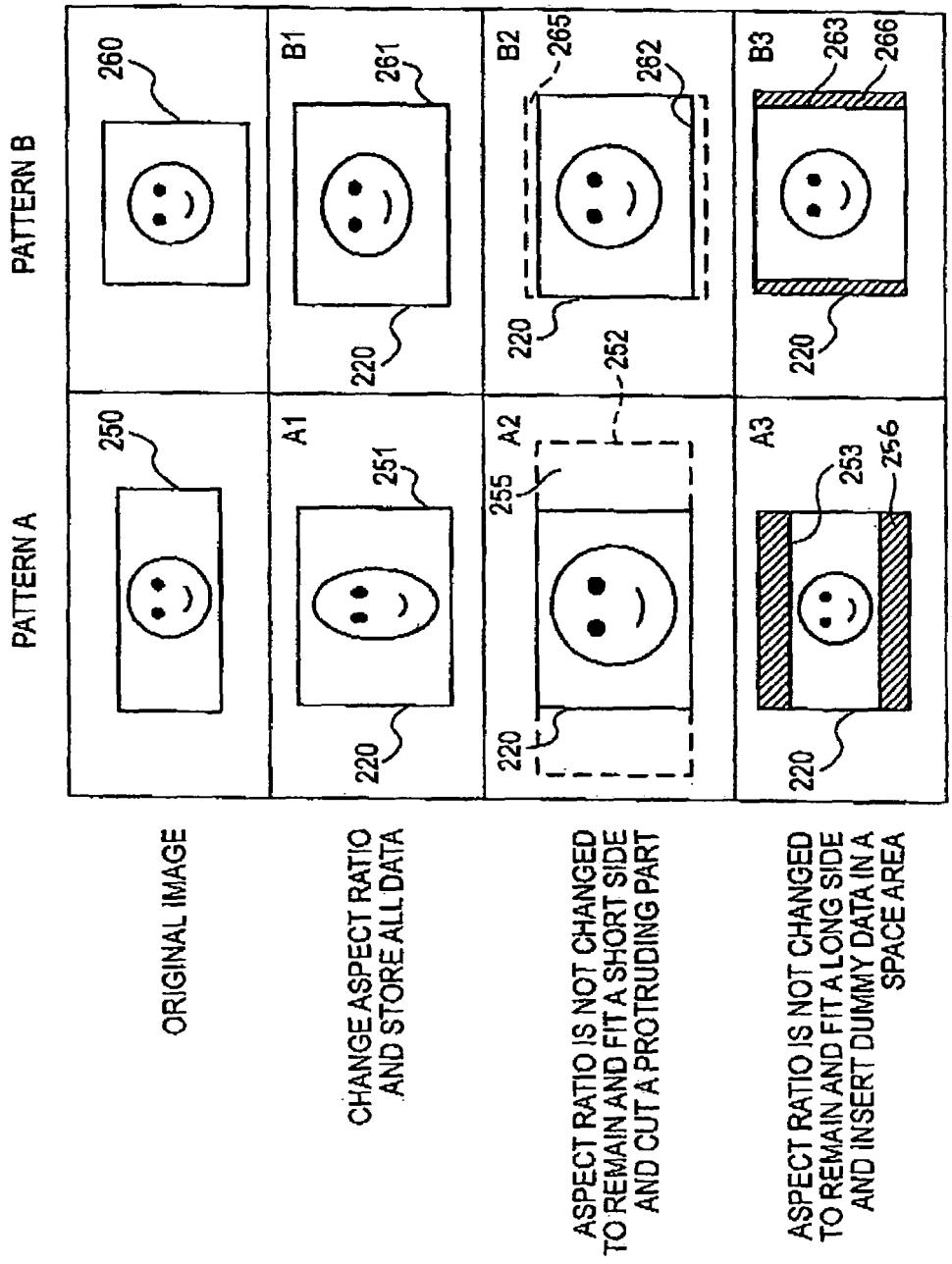
FIG. 11 is a diagram showing a storage manner of the thumbnail images to the EXIF file.
Figure 12:
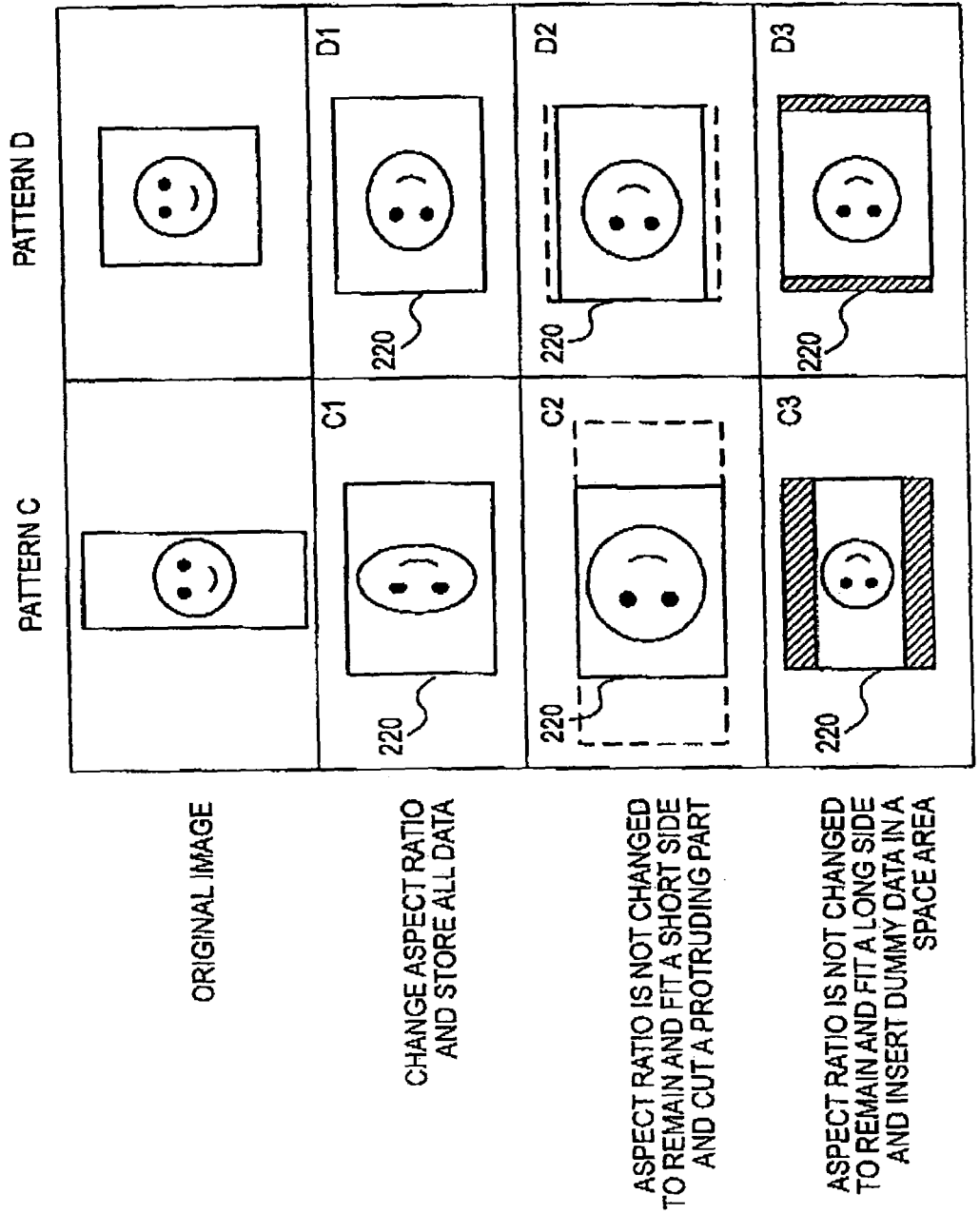
FIG. 12 is a diagram showing a storage manner of the thumbnail images to the EXIF file.

Firstly, as shown in FIGS. 11 and 12, there are following 4 patterns when patterns of an aspect ration of the thumbnail image area are classified:

Pattern A: Horizontally long image having an aspect ratio N:3 (N>4),

Pattern B: Horizontally long image having an aspect ratio N:3 (3<N<4),

Pattern C: Vertically long image having an aspect ratio 3:N (N>4), and

Pattern D: Vertically long image having an aspect ratio 3:N (3<N<4).

Patterns A and B shown in FIG. 11 will be described. In the case of patterns A and B, there are three ways to fit the image to the thumbnail frame 220 when generating the JPEG thumbnail image data 83 and storing it into the EXIF file 84. That is, the first way is to enlarge or reduce the thumbnail image area in a vertical direction or in a horizontal direction to change the aspect ratio of the original images 250 and 260, thereby fitting the image to the thumbnail frame 220. That is, as shown in A1 and B1 of the FIG. 11, the aspect ratio is changed from the original ratio of the original images 250 and 260 to the image to the thumbnail frame 220.

The second way is to enlarge or reduce the original image without changing the aspect ratio of the original image, and fit a short side of the original image to a side of the aspect frame in a same direction to said short side. As shown in A2 of the FIG. 11, in the pattern A, the original image 250 is enlarged or reduced without changing the aspect ratio of the original image 250 so as to fit a length of a vertical side 252 to a length of a vertical side of the thumbnail frame 220. Accordingly, the image becomes an area shown by a broken line. Here, a portion 255 protruded from the image area in a horizontal direction is cut, and a center portion is employed as a thumbnail image. In the pattern B, the original image 260 is enlarged or reduced without changing the aspect ratio of the original image so as to fit a length of a horizontal side 262 to a length of a horizontal side of the thumbnail frame 220. Accordingly, the image becomes an area shown by a broken line. Here, a portion 265 protruded from the image area in a vertical direction is cut, and a center portion is employed as the thumbnail image.

The third way is to enlarge or reduce the original image without changing the aspect ratio of the original image to fit a long side of the original image to the aspect frame. In the pattern A, as shown A3 of FIG. 11, the original image 250 is enlarged or reduced without changing the aspect ratio of the original image so as to fit a length of a horizontal side 253 to a length of a horizontal side of the thumbnail frame. In this case, a whole area of the original image falls within the thumbnail frame and the original image 250 is included in the thumbnail frame 220. Areas 256 (hatched portion in the drawing) at upper and lower portions of the original image are empty areas 25 where the image data does not exist. The empty areas 256 are filled with predetermined data such as white pixel and black pixel and constitute the thumbnail image. In the pattern B, the original image 260 is enlarged or reduced without changing the aspect ratio of the original image to fit a length of a vertical side to a length of a vertical side of the thumbnail frame. In this case, whole are of the original image 260 is included in the thumbnail frame 200 and empty areas 266 (hatched portion in the drawing) where data does not exist at the right and left sides of the original image are exist. Similarly, the empty areas 266 are filled with the predetermined data and constitute the thumbnail image. Incidentally, although, in the example, the original image is arranged at a position where the empty areas become equal, the position of the original image is not limited thereto. For example, the original image may be arranged so as to contact at three sides of the thumbnail frame.

Next, the patterns C and D are described with reference to FIG. 12. Whether a pattern becomes the pattern A or B or the pattern C or D is determined depending on a direction in which the original image 81 is read. When the thumbnail image area is the pattern C or D, the controller 11 matches directions of a long side and a short side of the thumbnail image area with directions of a long side and a short side of the thumbnail frame. In this case, the controller 11 rotates the image in right or left by 90 degrees (in FIG. 12, 90 degrees in left). In a state that the directions of the long side and the short side are matched, the image is processed in the same manner with the patterns A and B. This process can be applied to the case that the horizontal-to-vertical aspect ratio is 3:4.

Figure 13:
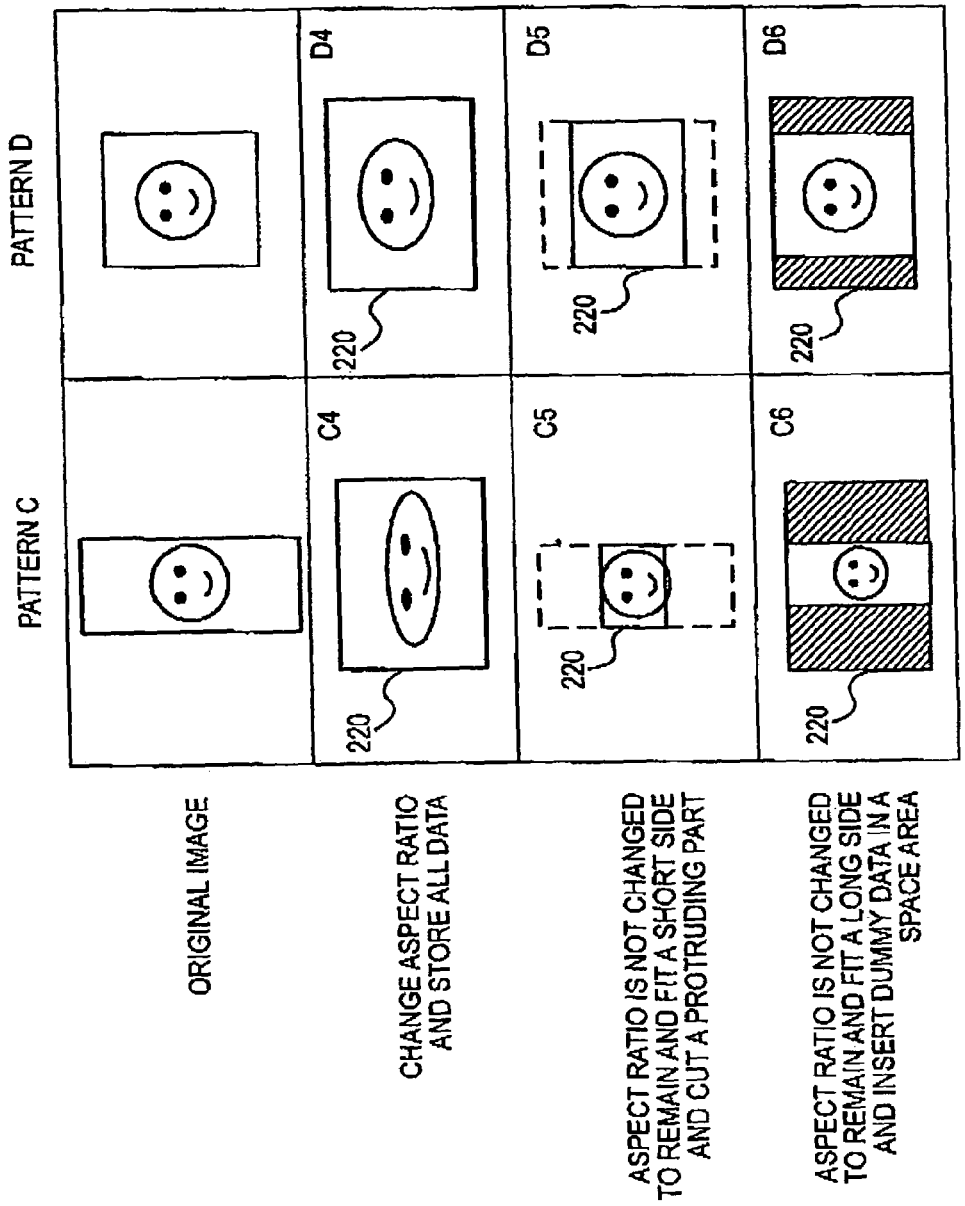
FIG. 13 is a diagram showing a storage manner of the thumbnail images to the EXIF file.

Incidentally, also in the case of the pattern C and D, as shown in FIG. 13, the thumbnail image area may be fitted to the thumbnail frame 220 without rotating the image in the above manner.

Second Embodiment

Now, a second embodiment of an image selecting information display device, a printing device and an image selecting information display method that embody the present invention will be described below by referring to FIGS. 14 to 23.

Figure 14:
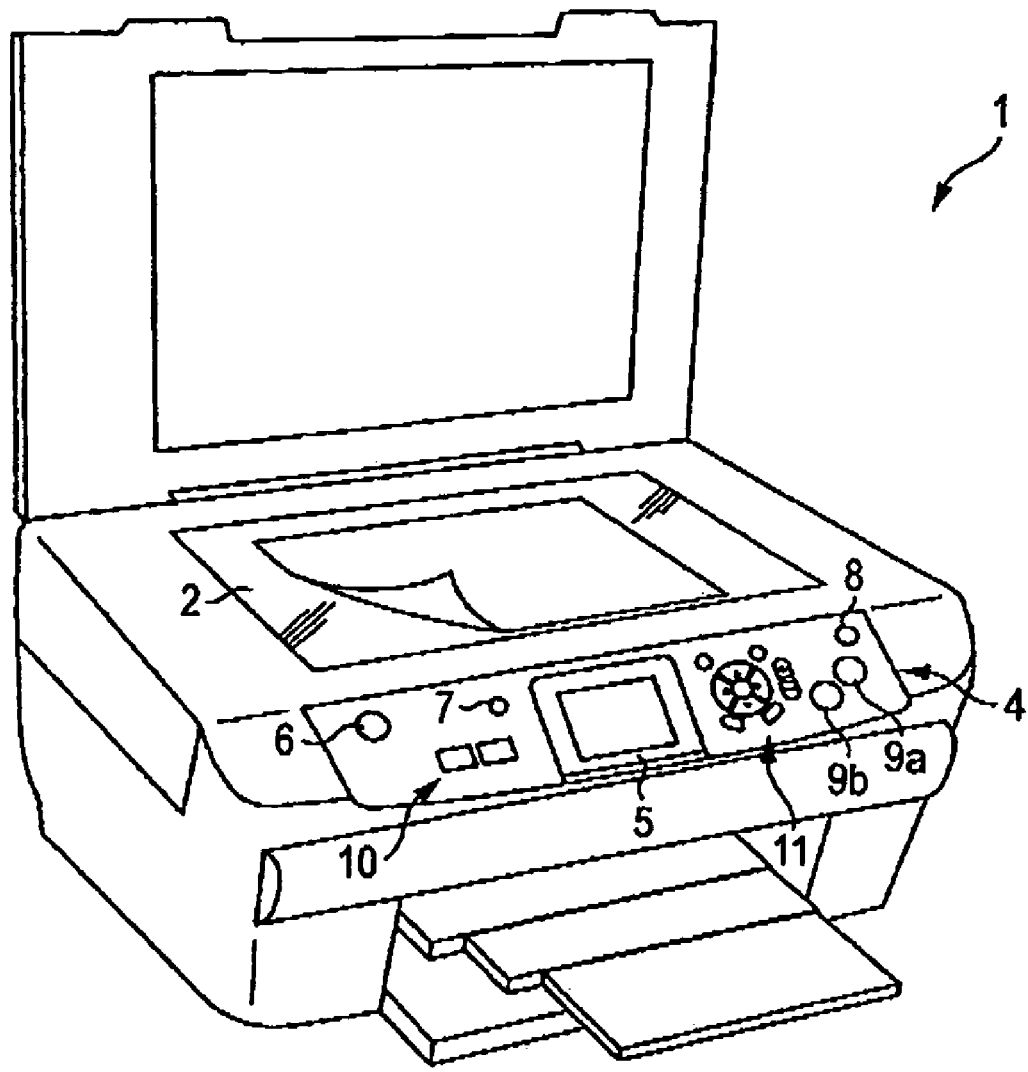
FIG. 14 is a perspective view of a multifunction printer apparatus in a second embodiment.

FIG. 14 is a perspective view of a multifunction printer apparatus 101 (ordinarily called an SPC). The multifunction printer apparatus 101 is a machine type that satisfies a scanner function, a printing function and a copying function by itself. The scanner function indicates a function for scanning an original copy set on an original copy holder 102 and converting read image data to digital data. The scanned data can be transmitted from the multifunction printer apparatus 101 to a host computer. The printing function indicates a function for printing and outputting externally fetched image data (for instance, print data received from the host computer). Further, the copying function is a function for scanning the original copy set on the original copy holder 102 and printing and outputting scanned data thereof. To the multifunction printer apparatus 101, an external storing media 103 (for instance, a memory card or the like) can be connected.

Figure 15:
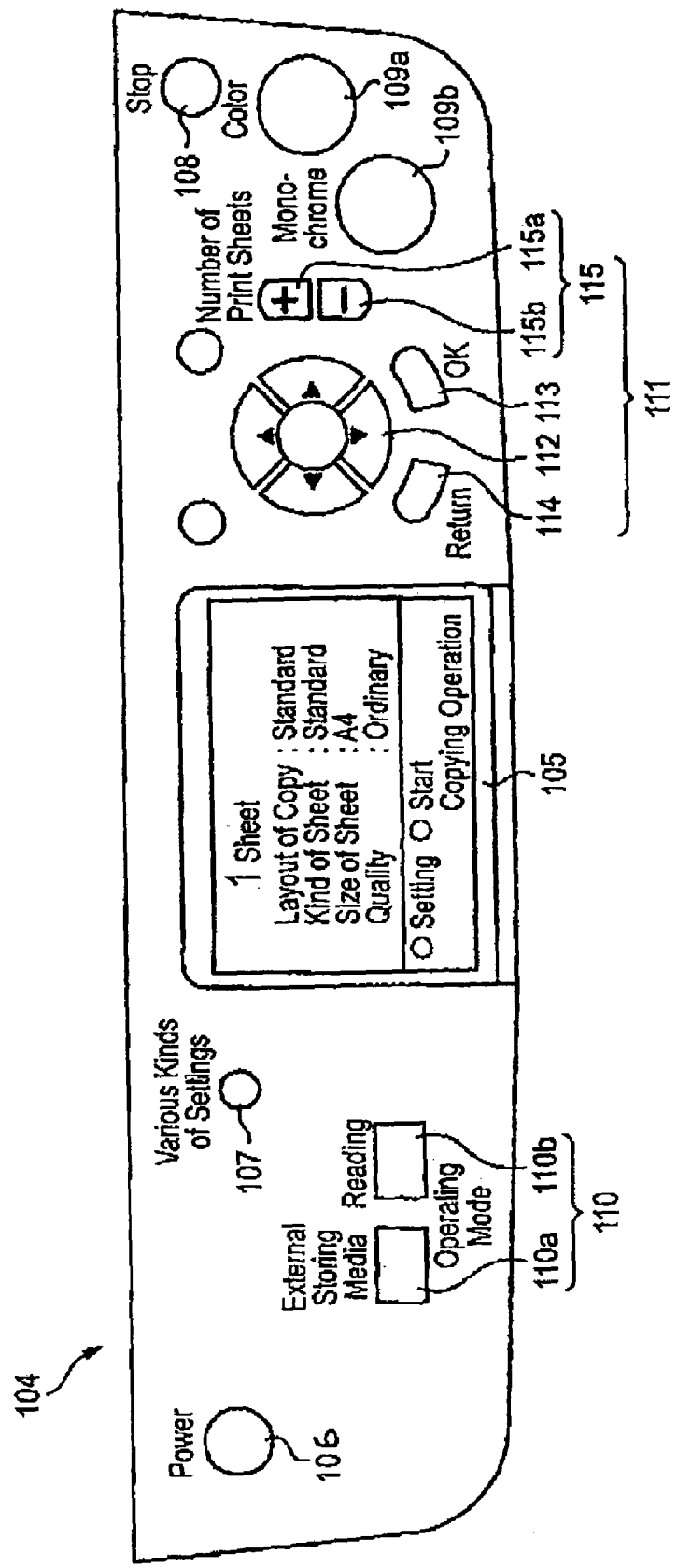
FIG. 15 is a plan view of an operating panel of the multifunction printer apparatus.

FIG. 15 is a plan view of an operating panel 104 of the multifunction printer apparatus 101. On the front surface part of the multifunction printer apparatus 101, the operating panel 104 having various kinds of operating buttons, a lamp, a preview monitor, etc. is disposed. On the operating panel 104, the preview monitor (a liquid crystal display device) 105 for displaying a menu, setting items, a photograph or the like is provided. On the operating panel 104, a power button 106 for turning on/off a power, a setting button 107 for various kinds of settings of head cleaning, a nozzle check, a residual amount of ink, an adjustment of a gap, etc., a stop button 108 for stopping an operation during an execution and two kinds of start buttons 109a and 109b for color/mono chromatic pressed when a printing/scanning operation is started are disposed. The external storing media 103 forms a storing medium and the preview monitor 105 corresponds a display unit.

On the operating panel 104, an operating mode selecting button 110 for selecting the operating mode of the multifunction printer apparatus 101 is disposed. The operating mode selecting button 110 includes an external storing media button 110a and a reading button 110b. The external storing media button 110a is operated when an image in the external storing media 103 is printed and outputted or when an image in the external storing media 103 is stored in other memory (other external storing media or the like). The reading button 110b is operated when a scanned image is printed and outputted or a scanned image is stored in a memory (the external storing media 103 or the like).

Further, a scanning process carried out by the multifunction printer apparatus 101 includes at least two kinds of processes. One kind of scanning process thereof is a process in which a plurality of images are continuously read from an original copy of a photograph film strip, the images are printed and outputted or stored in the external storing media 103 (refer this process to as a transparent original copy process, hereinafter). The other kind of scanning process is a process in which an image is read from an original copy of a cut sheet and the image is printed and outputted (an ordinary copying process) or stored in the external storing media 103 (refer this process to as a reflective original copy process, hereinafter). Exclusive buttons (a film button and a scan button) may be provided respectively in the transparent original copy process and the reflective original copy process.

On the operating panel 104, a group of buttons 111 used when a cursor is operated in the menu displayed on the preview monitor 105 are disposed. The group of buttons 111 includes a selecting button 112 used when the items or setting values are selected, an OK button 113 for asserting a selected/changed setting, a return button 114 for canceling the setting during an operation and a number of print sheet button 115 for setting the number of print sheets/the number of sets are provided. The number of print sheet button 115 includes a plus button 115a pressed when the number of print sheets is incremented and a minus button 115b pressed when the number of print sheets is decremented. The selecting button 112 corresponds to a selecting unit and the number of print sheet button 115 corresponds to an input unit.

Figure 16:
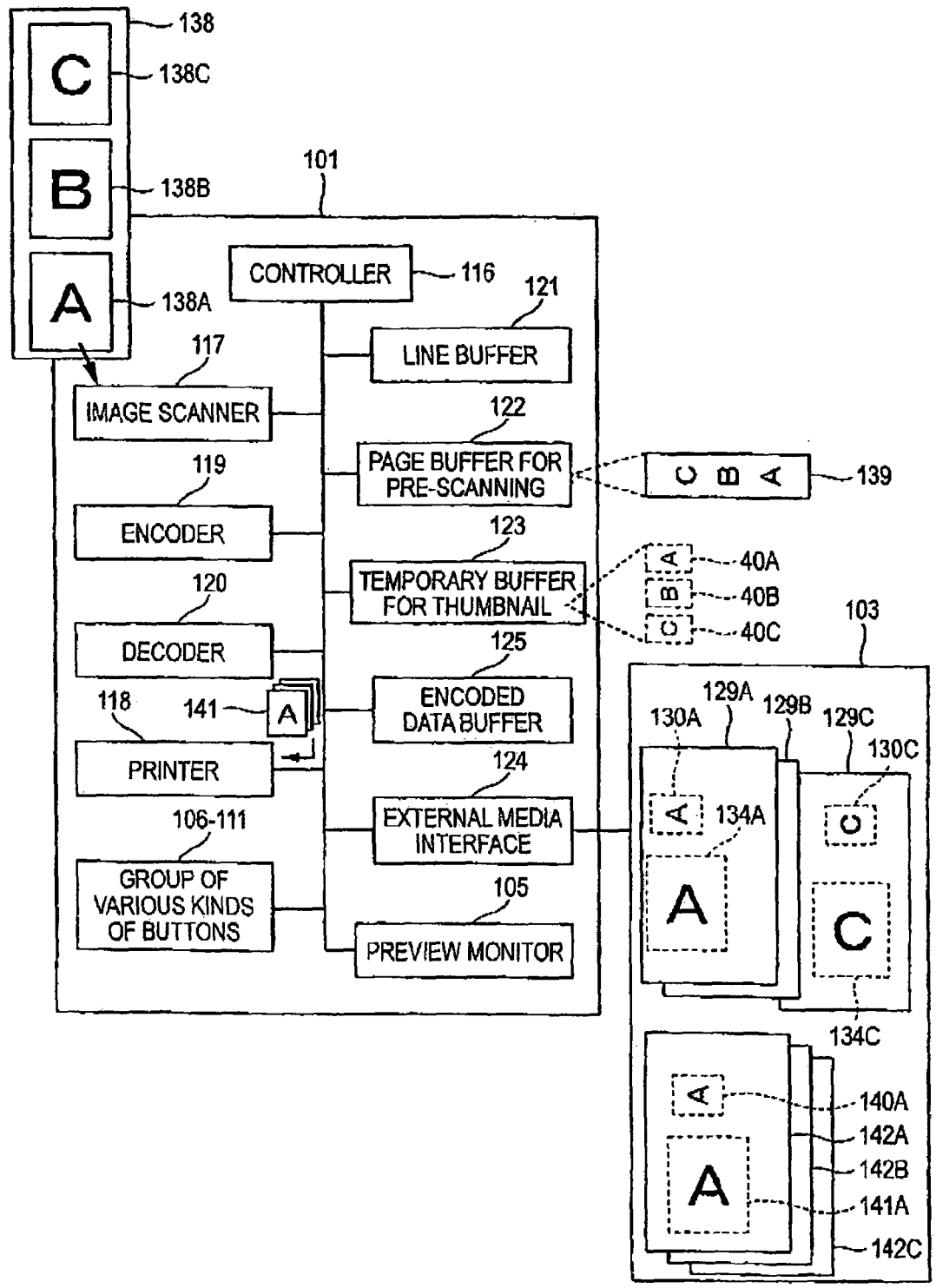
FIG. 16 is a block diagram showing an electric structure of the multifunction printer apparatus.
Figure 17:
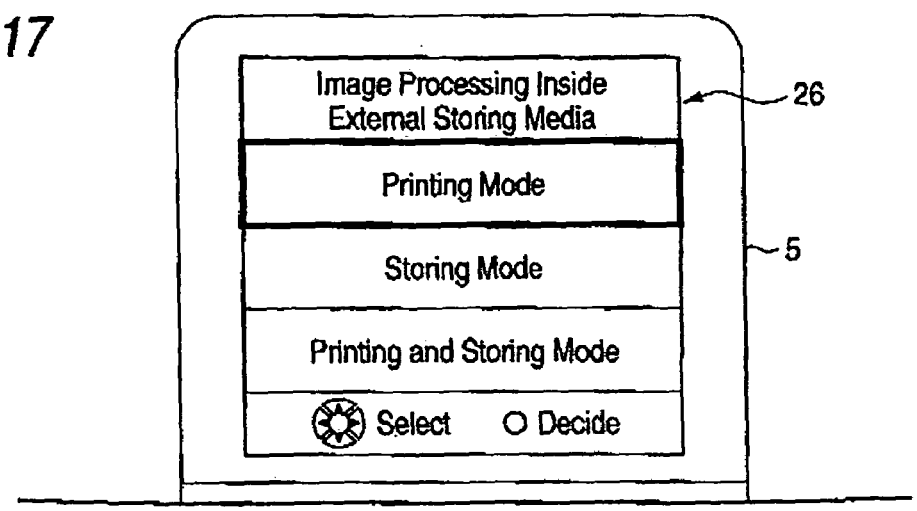
FIG. 17 is a diagram of a screen showing processes in an external storing media displayed on a preview monitor.

FIG. 16 is a block diagram showing the electric structure of the multifunction printer apparatus 101. The multifunction printer apparatus 101 includes a controller 116 for controlling the entire part of the multifunction printer apparatus 101, an image scanner 117 for reading an image of an original copy and a printer 118 for outputting a hard copy of the image. The multifunction printer apparatus 101 can be connected to the external storing media 103 (typically, for instance, a memory card used in a digital still camera or the digital still camera or the like). As the external storing media 103, for instance, a CD-R, a DVD, an MO, an USM flash memory are exemplified except the above-described external storing media. The controller 116 forms a designating unit, a mode setting unit, a display control unit, a total number of print sheet calculating unit, a remaining storage capacity calculating unit and a printing, storing and executing unit. The image scanner 117 corresponds to a scanning unit and the printer 118 corresponds to a printing mechanism.

The controller 116 can read image data from the external storing media 103 to print and output a selected and designated image by the printer 118 (that is, a direct print) or can read the image data from the external storing media 103 to store the designated and selected image in other external storing media 103 (that is, back up). Further, the controller 116 also can read the image data from the external storing media 103 to print and output a predetermined number of print sheets of the selected and designated image by the printer 118 and store each one sheet of the image data of the image to be printed in the external storing media 103 (that is, a direct print and storage).

Further, the controller 116 can print and output the selected and designated image of the image data read by the image scanner 117 (that is, a scan to print) or can store the selected and designated image of the read image data in the external storing media 103 (that is, a scan to memory). Further, the controller 116 also can print and output a predetermined number of print sheets of the selected and designated image of scanned images read by the image scanner 117 and can store each one sheet of the image data of the image to be printed in the external storing media 103 (that is, a scan to print and storage).

The image scanner 117 includes, as an operating mode when the image of an original copy sheet is read, a main scanning mode for reading the image of an area designated on the original copy sheet with a predetermined high resolution and a pre-scanning mode for reading the image of the entire area of the original copy sheet with a predetermined low resolution before the main scanning mode is performed to designate the area of the original copy to be read by the main scanning operation. In the pre-scanning mode, the image data of a size extremely smaller than the image data obtained by the main scanning operation, for instance, the image of the original copy of an A4 size is read as the image data of the small size such as 160 dots×120 dots.

As the printer 118, for instance, an ink jet printer is employed. In the ink jet printer, a carriage can be reciprocated in a main scanning direction by a carriage motor and a sheet (a printing medium) can be fed by a sheet feed motor. The printer 118 drives the carriage motor to move the carriage forward for one-pass and allows ink to discharge from a printing head at a predetermined timing during the movement and stick the ink to the sheet. In the printer 118, after the forward movement of the carriage for one-pass is completed, the sheet is fed. Subsequently, the carriage is moved backward for one-pass and the ink is discharged during its movement. The above-described operations are repeated to perform a printing process.

The multifunction printer apparatus 1 further includes an encoder 119, a decoder 120, a line buffer 121, a page buffer 122 for pre-scanning, a temporary buffer 123 for a thumbnail, an external media I/F (an external media interface) 124 and an encoded data buffer 125. The encoder 119 is a circuit that compresses and converts the image data of a bit map form to encoded data of a predetermined form, for instance, the image data of a JPEG form. The decoder 120 is a circuit that expands and converts the encoded data of the predetermined form, for instance, the image data of the JPEG form to the original image data of the bit map form.

The external media I/F 124 of this embodiment is a memory card slot provided in the multifunction printer apparatus 101. The external media I/F 124 is an I/F (an illustration is omitted) for supporting a predetermined communication standard such as USB or IEEE 1394 and may be an I/F that can be connected to an external device. In this case, when the external storing media is a CD-R disk, a CD-R drive corresponds to the external device. Whether the external string media is directly connected to the external media I/F like the memory card or the external device on which the external storing media is mounted is connected to the external media I/F, an access for reading and writing the external storing media is finally carried out in accordance with an instruction of the external media X/F 124. Accordingly, the external media I/F 124 corresponds to a reading unit.

The line buffer 121 serves to temporarily store the image data for one line or for a plurality of predetermined number of lines outputted from the image scanner 117 when the image scanner 117 reads the image of the original copy. The page buffer 122 for pre-scanning serves to temporarily store the image-data of a small size (for instance, 160 dots×120 dots) read by the pre-scanning operation of the image scanner 117. The temporary buffer 123 for a thumbnail serves to temporarily store the thumbnail image data of an image as an object when the direct print operation, the back up operation, the scan-to-memory operation or the scan-to-print operation is carried out. The encoded data buffer 125 serves to temporarily store a predetermined unit transfer amount of the encoded data (for instances the data of the JPEG form) outputted from the encoder 119 when the scan-to-memory operation is carried out or a predetermined unit transfer amount of the encoded data (for instance, the data of the JPEG form) read from the external storing media 103 when the direct print operation or the back up operation is carried out.

The external media interface 124 is a circuit that performs a communication of data with the external storing media 103 connected to the multifunction printer apparatus 101. The preview monitor 105 serves to display various kinds of selected screens, the image/thumbnail image as an object to be processed when the direct print operation, the back up operation, the direct print and storage operation, the scan-to-memory operation, the scan-to-print operation and the scan to print and storage operation are carried out. The group of various kinds of buttons 106 to 111 are buttons used for inputting commands from a user to the multifunction print device 1. The commands that can be inputted by the group of various kinds of buttons 106 to 111 include, for instance, a command for designating an image as an object of the direct print operation, the back up operation and the direct print and storage operation, a command for designating an image as an object of the scan-to-memory operation, the scan-to-print operation or the scan to print and storage operation and a command for designating an area to be mainly scanned from the images of the original copy read by the pre-scanning operation.

The controller 116 controls the preview monitor 105 to display a screen according to an operation on the basis of an operating signal outputted when the group of various kinds of buttons 106 to 111 are operated. For instance, when the external storing media button 110a is pressed, the controller 116 controls the preview monitor 105 to display a first selecting screen 126 shown in FIG. 17. When the reading button 110b is pressed, the controller 116 controls the preview monitor 105 to firstly display an original copy process selecting screen 127 shown in FIG. 18 and then display a second selecting screen 128 shown in FIG. 19 in a low-order layer thereof.

Now, the direct print operation of the multifunction printer apparatus will be described below.

When the direct print operation is carried out, a user connects the external storing media 103 to the external media I/F 124 to press the external media button 110a on the operating panel 104 for setting the operating mode of the multifunction printer apparatus 101. For instance, when the external storing media 103 is the memory card, the external storing media 103 is connected to the external medial I/F 124, the memory card is inserted into the slot of the multifunction printer apparatus 101. When the external storing media is the CD-R drive or the like, the CD-R drive is connected to the multifunction printer apparatus 101 by a connecting cable.

When the external storing media button 110a is pressed down, the controller 116 sets the operating mode of the multifunction printer apparatus 101 to an image process in the external storing media in which an image as an object to be used is an image of the external storing media 103. Then, the controller 116 controls the preview monitor 105 to display the first selecting screen 126 shown in FIG. 17. The first selecting screen 126 is a selecting screen for setting a low-order mode of an image process in the memory card. The first selecting screen 126 includes an item for setting the operating mode of the multifunction printer apparatus 101 to a printing mode (that is, the direct print), an item for setting the operating mode of the multifunction printer apparatus 101 to a storing mode (that is, the back up) and an item for setting the processing mode of the multifunction printer apparatus 101 to a printing and storing mode (that is, the direct print and storage).

The printing mode indicates a mode in which the set number of sheets of an image selected and designated among images stored in the external storing media 103 are printed and outputted. The storing mode indicates a mode in which the image selected designated among the images stored in the external storing media 103 is written in other memory (for instance, other external storing media except the external storing media 103). The printing and storing mode indicates a mode in which the above-described printing mode is combined with the storing mode to be one mode. In the printing and storing mode, the set number of sheets of the image selected designated among the images stored in the external media 103 are printed and outputted and the image as an object to be printed is written in other memory.

Here, when the item of the printing mode is selected and designated, the controller 116 sets the processing mode of the multifunction printer apparatus 101 to the direct print operation to perform the processes of a preview and a selection of the image. In the processes, the external media I/F 124 firstly sequentially and successively reads each predetermined unit transfer amount of JPEG thumbnail image data 130A... from the plurality of EXIF files 129A, 129B, 129C... of the images stored in the external storing media 103. The external media I/F 124 supplies the unit transfer amount of the successively read JPEG thumbnail image data 130A... to the decoder 120. The decoder 120 successively decodes the inputted JPEG thumbnail image data 130A... in order of input to sequentially restore a plurality of original thumbnail images of a bit map form and sends the restored image data to the preview monitor 105.

Figure 20:
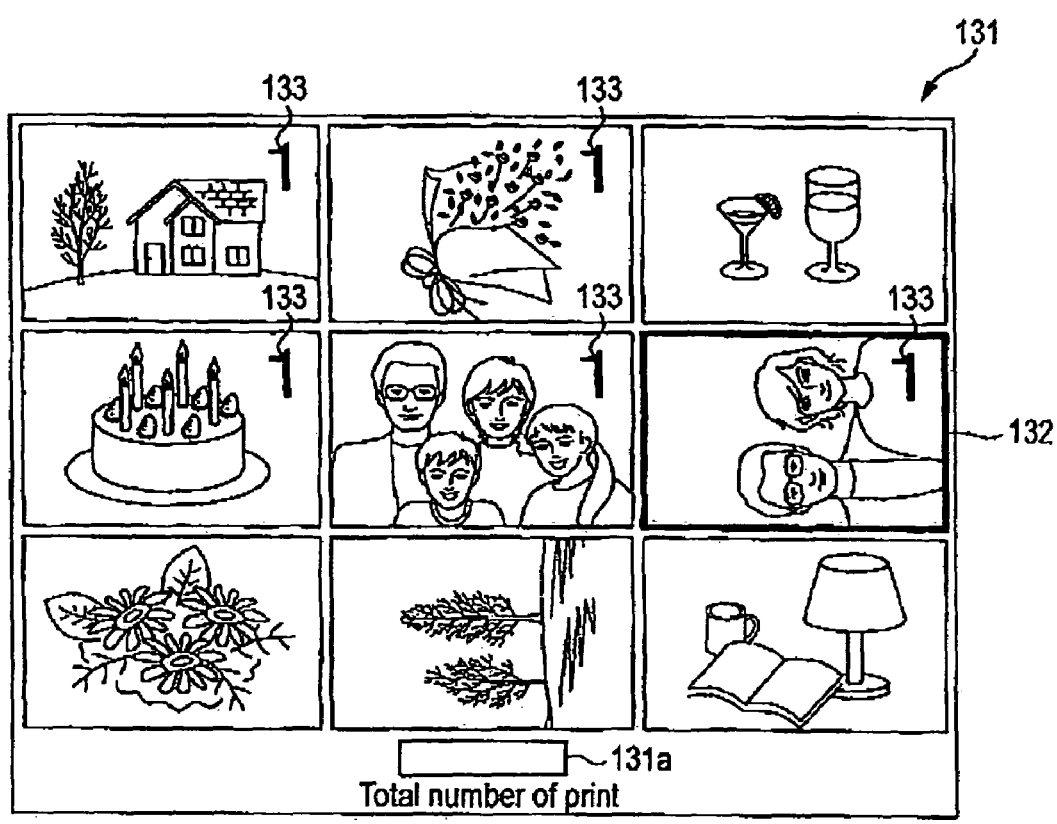
FIG. 20 is a diagram of a screen showing the list of printing images displayed on the preview monitor.

As a result, the controller 116 controls the preview monitor 105 to display a list screen 131 of images to be printed shown in FIG. 20 in which the plurality of thumbnail images stored in the external storing media 103 are displayed as a list. On the list screen 131 for images to be printed, a rectangular selecting frame 132 in which a printing condition (the number of print sheets) is inputted for a predetermined one sheet of the thumbnail images displayed on the list and the number of print sheets 133 inputted for each of the thumbnail images are shown. The selecting frame 132 can be moved upward and downward and rightward and leftward on the preview monitor 105 by operating the selecting button 112 on the operating panel 104. The number of print sheets 133 constitutes selecting information. As the printing condition referred herein, for instance, the contents of an image process, a printing mode, the size of sheets, the detail of the quality of a printed image (contrast, sharpness, etc.) as well as the number of print sheets correspond processing conditions.

When the thumbnail image on the list screen 131 for images to be printed is selected and designated by the selecting frame 132, the number of print sheets 133 can be inputted. In the number of print sheets 133, the number of sheets is increased for every sheet by pressing the plus button 115a of the number of print sheet button 115 once. On the other hand, the number of sheets is decreased for every sheet by pressing the minus button 115b of the number of print sheet button 115 once. Thus, the number of print sheets 133 overlapped on the thumbnail image is displayed. The user selects one or more images to be printed among the plurality of thumbnail images of the list screen 131 for images to be printed and inputs the number of print sheets thereof.

After the item of the printing mode is selected and designated on the first selecting screen 126, a screen for selecting a print of all images and a print of selected images may be displayed on the preview monitor 105. When the print of selected images is selected on this screen, an image desired to be printed is selected and designated in accordance with the above-described procedure. On the other hand, when the print of all images is selected, all the images are set as objects to be printed and the list screen 131 for images to be printed in which the number of print sheets of "1" is displayed for each image is shown on the preview monitor 105. At this time, while the list screen 131 for images to be printed is displayed, every time the plus button 15a of the number of print sheet-button 115 is pressed, the number of print sheets of all the images may be increased one by one, for instance, 2, 3 . . . . Every time the minus button 115b is pressed, the number of print sheets of all the images may be decreased. This may be likewise applied to below-described processes respectively.

Further, the controller 116 counts the total number of print sheets of the image by using a counter therein to display the total number of print sheets as a numeric value on the list screen 131 for images to be printed. As a method for counting the total number of print sheets, for instance, there is a method in which after the list screen 131 for images to be printed is displayed, every time the plus button 115a of the number of print sheet button 115 is pressed, the counter is incremented, and every time the minus button 115b is pressed, the counter is decremented. Accordingly, on the list screen 131 for images to be printed, the total number of print sheets 131a is displayed as a numeric value in the lower side of the list of the images. Since the controller 116 performs a calculating process whenever the number of print sheets is inputted, the total number of print sheets 131a changes in real time every time the number of print sheets is inputted.

Further, the list of the images on the list screen 131 for images to be printed can be scrolled by pressing, for instance, the right and left parts of the selecting button 112. In this embodiment, the images of only nine sheets can be displayed on one screen of the preview monitor 105. Accordingly, for instance, when the images of 130 sheets are fetched, the images of nine sheets are initially displayed on the preview monitor 105. Then, for instance, when the right side of the selecting button 112 is pressed, the images of next nine sheets are displayed on the preview monitor 105. This operation is repeated in accordance with the number of fetched sheets of images.

When the process for previewing and selecting the images is finished, the controller 116 performs a process for reading and printing a main image. In this process, the external media I/F 124 successively reads each unit transfer amount of the JPEG main image data 134A of the EXIF file (as one example, the EXIF file 129A) of the image as an object to be printed selected by the user. The external media I/F 124 sends the unit transfer amount of the successively read JPEG main image data 134A to the decoder 120. The decoder 120 successively decodes the inputted JPEG main image data 134A in order of input to gradually restore the main image data of the original bit map form and transfers the restored main image data to the printer 118. When the transferred main image data of the original bit map form is stored by a predetermined amount necessary for starting a printing process, the printer 118 starts the printing process of the main image. There is a machine type of the printer in which a range desired to be printed can be designated by trimming the main image on the preview monitor 105 by the user before the main image is printed. In this machine type of the printer, the main image data of the original bit map form outputted from the decoder 120 may be sent to and displayed on the preview monitor 105 before the main image data is transferred to the printer 118.

Now, the back up operation will be described below.

In this case, as one example of the back up operation, for instance, a case in which the image is stored from a predetermined external storing media 103 to other external storing media 103 (for instance, the image is stored from the memory card to the CD-R drive) is exemplified. When the image is stored from the predetermined external storing media 103 to other external storing media 103, a source of storage and a destination of storage of the two external storing media 103 can be suitably selected and set.

Firstly, when the back up operation is carried out, the user connects the two external storing media 103 to the external media I/F 124 to press down the external storing media button 110a of the operating panel 104 for setting the operating mode of the multifunction printer apparatus 1. Then, the controller 116 sets the operating mode of the multifunction printer apparatus 101 to an image process in the external storing media in which an image as an object to be used is the image of the external storing media 103. The controller 116 displays the first selecting screen 126 shown in FIG. 17 on the preview monitor 105. The first selecting screen 126 is the same as that used during the direct print operation.

When the item of the storing mode is selected and designated on the first selecting screen 126, the controller 116 sets the operating mode of the multifunction printer apparatus 101 to a back up mode to perform the process for previewing and selecting the image. In this process, the external media I/F 124 firstly sequentially and successively reads each predetermined unit transfer amount of JPEG thumbnail image data 130A . . . from the plurality of EXIF files 129A, 129B, 129C . . . of the images stored in the external storing media 103. Then, the external media I/F 124 supplies the unit transfer amount of the successively read JPEG thumbnail image data 130A . . . to the decoder 120. The decoder 120 successively decodes the inputted JPEG thumbnail image data 130A . . . in order of input to sequentially restore a plurality of original thumbnail images of a bit map form and sends the restored image data to the preview monitor 105.

Figure 21:
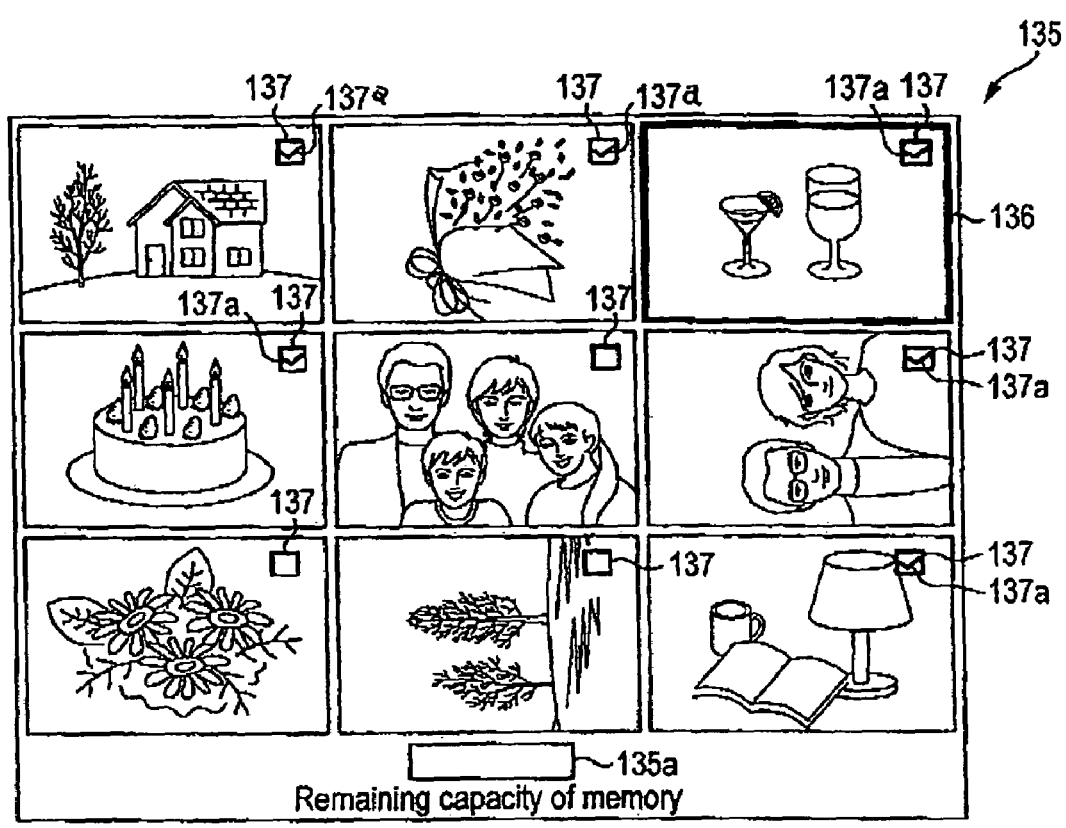
FIG. 21 is a diagram of a screen showing the list of storing images displayed on the preview monitor.

As a result, the controller 116 controls the preview monitor 105 to display a list screen 135 for images to be stored shown in FIG. 21 in which the plurality of thumbnail images stored in the external storing media 103 are displayed as a list. On the list screen 135 for images to be stored, a rectangular selecting frame 136 in which a storing check is inputted to a predetermined one sheet of the thumbnail images displayed as a list and a storing check box 137 for each thumbnail image are displayed. The selecting frame 136 can be moved upward and downward and rightward and leftward on the preview monitor 105 by operating the selecting button 112 of the operating panel 104.

When the thumbnail image on the list screen 135 for images to be stored is selected by the selecting frame 136, a storing check (a point of ✓) 137a can be inputted to the storing check box 137. The storing check 137a is given in the box 137 by pressing the plus button 115a of the number of print sheet button 115. The storing check 137a is erased from the box 137 by pressing the minus button 115b. The storing check 137a may be given by pressing the plus button 115a (or the minus button 115b) odd number of times. The checked state may be released by pressing the button odd number of times. The user selects one or more images to be stored among the plurality of thumbnail images of the list screen 135 for images to be stored. The storing check 137a constitutes selecting information (a designation and display of an object to be stored, processing conditions).

Further, the controller 116 calculates a remaining storage capacity of the external storing media 103 on the basis of a quantity of memory of the image designated as an object to be stored and the total storage capacity of the external storing media 103 as the source of storage. Then, the controller 116 displays the remaining storage capacity of the external storing media 103 on the list screen 135 for images to be stored as a numeric value. In this process, when the image as an object to be stored is designated, the controller 116 firstly calculates the quantity of memory thereof and writes the quantity of memory in an inner counter. Every time the image as an object to be stored is determined, the controller 116 adds a new quantity of memory of the image to the value of the counter. The controller 116 previously grasps the total storage capacity of the external storing media 103. The controller 116 performs an addition of the counter and calculates a difference between an added value and the total storage capacity of the external storing media 103 to calculate the difference value as the remaining storage capacity.

Then, the controller 116 displays the remaining storage capacity calculated in accordance with the above-described procedure on the list screen 135 for images to be stored in a numeric value. Accordingly, on the list screen 135 for images to be stored, the remaining storage capacity 135a of the external storing media 103 is displayed as a numeric value in the lower side of the images of the list. Since the controller 116 performs a calculating process whenever the image as an object to be stored is designated, the remaining storage capacity 135a changes in a real time. The images displayed on the list screen 135 for images to be stored can be also scrolled in the same manner as that of the list screen 131 for images to be printed when all the inputted images cannot be displayed at a time on the screen.

When the process for previewing and selecting the image is finished, the controller 116 performs a storing process. In this process, the external media I/F 124 firstly successively reads each unit transfer amount of the JPEG thumbnail image data 130A . . . and the JPEG main image data 134A . . . of the plurality of EXIF files 129A, 129B, 129C . . . of the images to be stored to which the checks of the storing check boxes 137 are given from the external storing media 103.

For instance, when the EXIF files 129A and 129C of the three EXIF files 129A to 129C in the memory card are selected as objects to be stored, each transfer amount of the JPEG thumbnail image data 130A and the JPEG main image data 134A of the EXIF file 129A is firstly read. Subsequently, each transfer amount of the JPEG thumbnail image data 130C and the JPEG main image data 134C of the EXIF file 129C is read. Then, the external media I/F 124 sequentially writes and stores the successively read image data of the EXIF files 129A, . . . in the CD-R drive. Here, for the convenience of an explanation, the two external storing media 103 are connected to one external media I/F 124. However, the multifunction printer apparatus 101 may have a plurality of external media IFs 124 and the external storing media 103 serving as the source of storage and the destination of storage may be respectively connected to each I/F.

Now, the direct print and storage operation will be described below.

In the direct and storage operation, the contents of the processes until the printing and outputting processes are substantially the same as those carried out in the direct print operation. The difference between the direct print and storage operation and the direct print operation resides in that the image selected and designated by the user is printed and outputted and the image designated to be printed is simultaneously stored in other external storing media. For instance, When three sheets of images of "A", two sheets of images of "B" and one sheet of an image of "C" are designated to be printed and outputted, A to C are printed and outputted for the number of print sheets in the printing process. The image data of A to C is respectively stored in other external storing media 103 one sheet at a time.

Now, the scan-to-print operation will be described below.

Here, the scanning process includes the two kinds of processes having the transparent original copy process in which a film is used as a scanned original copy and the reflective original copy process in which a cut sheet is used as a scanned original copy. The transparent original copy process is firstly described. The reflective original copy process is different from the transparent original copy process only in an original copy itself and has the same basic process as that of the transparent original copy process. Accordingly, the explanation of the reflective original copy process is omitted. When the scan-to-print operation is carried out, the user sets an original copy sheet 138 having a plurality of original copy images 138A to 138A like the photograph film strip in the image scanner 117. Then, the user presses down the reading button 110b on the operating panel 104 to set the operating mode of the multifunction printer apparatus 101.

Figure 18:
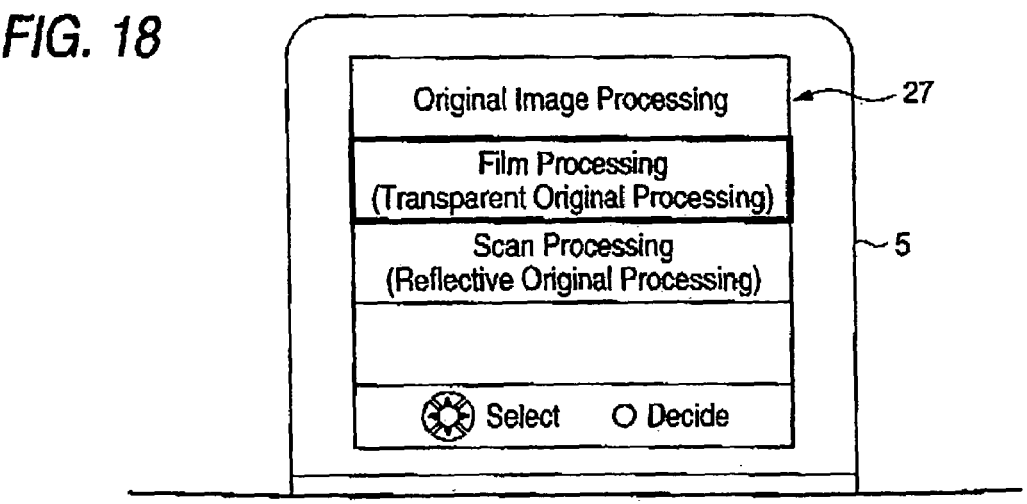
FIG. 18 is a diagram of a screen showing processes of an original copy image displayed on the preview monitor.
Figure 19:
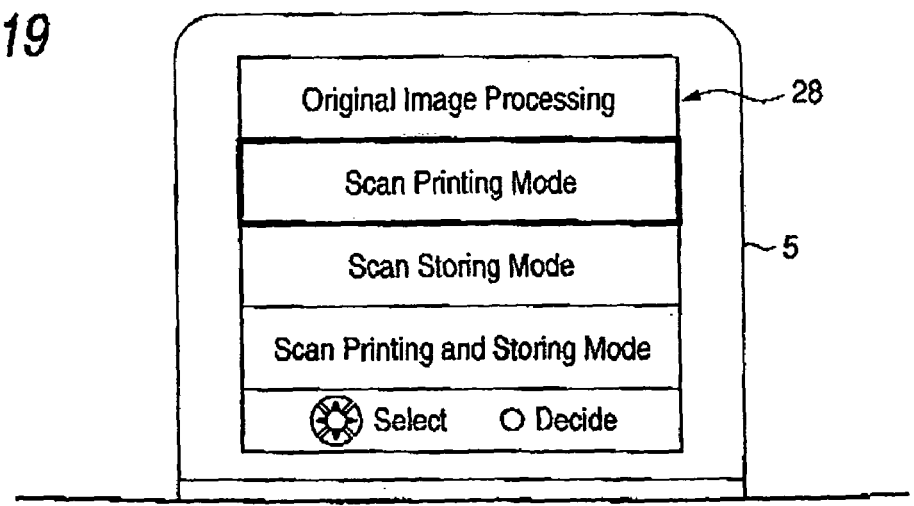
FIG. 19 is a diagram of a screen of a low-order layer in the processes of an original copy displayed on the preview monitor.

Here, when the reading button 110b is pressed down, the controller 116 sets the operating mode of the multifunction printer apparatus 101 to an original copy image process in which an image as an object to be used is a scanned image to display the original copy process selecting screen 127 shown in FIG. 18 on the preview monitor 105. The original copy process selecting screen 127 is a selecting screen for setting the low-order mode of the original copy image process. The original copy process selecting screen 127 includes an item of the transparent original copy process for setting the processing mode of the multifunction printer apparatus 101 to the reflective original copy process and an item of the reflecting process for setting the processing mode of the multifunction printer apparatus 101 to the transparent original copy process.

Here, as the scanning process, a case of the transparent original copy process is described. Accordingly, in the original copy process selecting screen 127, the item of the transparent original copy process is selected and designated. When the item of the transmitting process is selected and designated, the controller 116 sets the operating mode of the multifunction printer apparatus 101 to the transparent original copy process in which the image as an object to be used is an image of a photograph film to display the second selecting screen 128 shown in FIG. 19 on the preview monitor 105. The second selecting screen 128 is a selecting screen for setting the low-order mode of the transparent original copy process. The second selecting screen 128 includes an item for setting the processing mode of the multifunction printer apparatus 101 to the scan to print mode (that is, the scan to print), an item for setting the processing mode of the multifunction printer apparatus 101 to the scan to storage mode (that is, the scan to memory) and an item for setting the processing mode of the multifunction printer apparatus 101 to the scan to print and storage mode (that is, the scan to print and storage).

The scan to print mode is a mode for scanning and printing the selected and designated image among the plurality of images on the original copy sheet 138 for the set number of sheets. The scan to storage mode is a mode for scanning and writing the selected and designated image among the plurality of images on the original copy sheet 138 in the memory. The scan to print and storage mode is a mode in which the scan to print mode is combined with the scan to storage mode as one mode in which the selected and designated image is scanned and printed for the set number of sheets and the scanned image as an object to be printed is written in the memory.

When the item of the scan to print mode is selected and designated on the second selecting screen 128, the controller 116 sets the processing mode of the multifunction printer apparatus 101 to the scan to print to pre-scan the original copy sheet 138 by the image scanner 117. In this process, the image scanner 117 firstly successively reads the image of an entire area of the original copy sheet 138 one line by one line with a predetermined low resolution and outputs the image to write the image data of one line successively outputted in the line buffer 122. The image data of one line written in the line buffer 121 is immediately transferred to and accumulated in the page buffer 122 for pre-scanning. When the pre-scanning operation by the image scanner is finished, pre-scanned image data 139 with a bit map form of the area of the original copy sheet 138 read by the pre-scanning operation is stored in the page buffer 122 for pre-scanning. As described above, the data size of the pre-scanned image data 139 is smaller than that of the main image data read by the main scanning operation.

When the pre-scanning operation is completed, the controller 116 performs a process for deciding an area to be mainly scanned from the images of the original copy read by the pre-scanning operation. This area deciding process is automatically carried out. That is, the controller 116 examines the pre-scanned image data 139 in the page buffer 122 for pre-scanning to respectively detect the areas of the plurality of original copy images 138A to 138C therefrom and select them as the areas to be mainly scanned. The area deciding process may be carried out by the manual operation of the user.

When the above-described area deciding process is finished, the controller 116 performs a process for encoding a thumbnail image to be displayed to the JPEG form. In the encoding process, the encoder 119 reads the pre-scanned-image data 139 from the page buffer 122 for pre-scanning. At this time, the encoder 119 selects and sequentially reads the image data parts respectively corresponding to the plurality of original copy images 138A to 138C that are designated by the above-described area decision from the pre-scanned image data 139. The encoder 119 finely divides the read image data parts respectively corresponding to the original copy images 138A to 138C into small areas of a predetermined size, sequentially encodes the small areas to the JPEG forms and writes each predetermined unit transfer amount of the successively obtained encoded data of each of the small areas in the encoded data buffer 125.

The unit transfer amount of the encoded data written in the encoded data buffer 125 is immediately transferred to and accumulated in the temporary buffer 123 for the thumbnail as soon as the encoded data is written in the encoded data buffer. When the encoding process of the thumbnail to be displayed is finished, the plurality of JPEG thumbnail image data 140A, 140B and 140C respectively converted from the pre-scanned data of the plurality of original images 138A, 138B and 138C are stored in the temporary buffer 123 for the thumbnail.

When the above-described encoding process of the thumbnail to be displayed is finished, the controller 116 performs a process for previewing and selecting the image. In this process, the decoder 120 firstly sequentially reads the plurality of the JPEG thumbnail image data 140A, 140B and 140C from the temporary buffer 123 for the thumbnail to sequentially restore the thumbnail image data of the original bit map form and sends the restored thumbnail image data to the preview monitor 105.

As a result, the controller 116 displays the list screen 131 for images to be printed shown in FIG. 20 in which the thumbnail images of the scanned images are displayed in a list on the preview monitor 105. The list screen 131 for images to be printed shown in FIG. 20 is commonly used for the direct print operation and the scan-to-print operation. However, when the inputted images are different, the screens on which the respectively different images are shown are ordinarily displayed. The user selects one or more images to be printed among the plurality of the thumbnail images displayed on the list screen 131 for images to be printed and inputs the number of print sheets thereof by using the selecting button 112 and the number of print sheet button 115.

When the process for previewing and selecting the image is finished, the controller 116 mainly scans the image selected and designated by the user by using the image scanner 117 to perform a process for printing and outputting the image data fetched by the main scanning operation. In this process, the image scanner 117 firstly starts the main scanning operation to successively read and the image of the area designated on the original copy sheet 138 by the area decision one line by one line with a predetermined high resolution and output the read image. The image data of one line successively outputted is supplied to the printer 118 via the line buffer 121. When the main image data of a bit map form that is transferred is stored for a predetermined amount necessary for starting a printing process, the printer 118 starts the printing process of the main image.

The image data (that is, mainly scanned data 141 shown in FIG. 16) read by the main scanning process is the main image data. The mainly scanned image data is read with the high resolution of, for instance, 300 dpi. The data size of the entire image of the mainly scanned image data 141 is ordinarily megabyte order or more. The mainly scanned image data 141 has a quantity of data greatly more than that of the pre-scanned image data 139.

When a process accompanied by a display operation by a pre-scanning operation is selected by pressing the reading button 110*b* of the operating panel 104, the mode setting button such as the external storing media button 110*a* may be masked, that is, a state in which an operation is not permitted may be realized. This method is performed, because while the mode for carrying out the printing or the storing process is performed by performing the main scanning operation, after the thumbnail image is displayed by the pre-scanning operation, if the user changes the mode to a mode that is set by the user who erroneously presses down a button for setting other mode, irrespective of the erroneous depression, it takes long time until the thumbnail image is displayed again.

When the process accompanied by the display operation by the pre-scanning operation is selected, the original copy process selecting screen 127 or the second selecting screen 128 is displayed on the preview monitor 105 or the item selected and designated on the second selecting screen 128 is performed. A masking process may be started at a timing when the mode is instructed to be performed or at a timing when the pre-scanning operation is started. A masking state is preferably cancelled only when the user obviously intends to cancel the masking state due to the above-described reason. For instance, when the stop button 108 is pressed, the masking state is cancelled. It is to be understood that the masking state is cancelled when the process of the selected and designated item is finished.

Now, the scan-to-memory operation will be described below.

This operation is described for the transparent original copy process. When the item of the scan to storage mode is selected and designated on the second selecting screen 128, the controller 116 sets the processing mode of the multifunction printer apparatus 101 to the scan to memory process to perform the above-described processes including the pre-scanning process or operation, the area selecting process or operation and the thumbnail encoding process or operation. The contents of the processes are the same as those of the scan to print process. Accordingly, the detail thereof is omitted. After the thumbnail encoding process is finished, the controller 116 carries out the process for previewing and selecting the image with the same contents of the processes as those of the scan to print process.

As a result, the controller 116 displays the list screen 135 for images to be stored shown in FIG. 21 in which the thumbnail images of the scanned images are displayed as a list on the preview monitor 105. The list screen 135 for images to be stored shown in FIG. 21 is commonly used for the scan to print process and the scan to memory process. However, when the scanned images are different, the screens on which the different images are respectively shown are shown. The user operates the selecting button 112 and the number of print sheet button 115 to give the storing check 137*a* in the storing check box 137 and select one or more images to be stored among the plurality of thumbnail images on the list screen 135 for images to be stored.

When the process for previewing and selecting the image is finished, the controller 116 performs a process for storing the JPEG thumbnail image selected by the user among the JPEG thumbnail image data 140A to 140C in the temporary buffer 123 for the thumbnail in the external storing media 103. Firstly, the temporary buffer 123 for the thumbnail supplies the first image data selected by the user among the plurality of the JPEG thumbnail image data 140A to 140C stored in itself in the above-described process for previewing and selecting the image to the external media I/F 124 via the encoded data buffer 125. The external media I/F 124 writes the image data sent from the temporary buffer 123 for the thumbnail in the external storing media 103. When the external medial I/F 124 writes the received JPEG thumbnail image data (for instance, 140A) in the external storing media 103, the external media I/F 124 newly forms a file 142A of the EXIF form to write the received JPEG thumbnail image data 140A in the EXIF file 142A.

When the thumbnail storing process is finished, the controller 116 performs a main scanning process and an encoding process of a main image read by the main scanning process or operation. In the main scanning and encoding processes, each of the original copy images (for instance, 138A) on the original copy sheet 138 that is designated in the image selecting process is read with a high resolution by the image scanner 117 by the substantially same method as that of the main scanning and encoding processes described in the scan to print process. The read image is encoded to the JPEG form. Then, JPEG main image data 141A obtained by the main scanning process or operation is written in the corresponding EXIF file 142A in the external storing media 103.

When the main scanning and encoding processes of the one original copy image selected by the user is finished, the above-described thumbnail storing process and the main scanning and encoding processes are performed for another one original copy image selected by the user. These processes are repeated. As a result, all the selected original copy images are stored in the external storing media 103 in the forms of EXIF files 142A, 142B . . . . After that, the images can be treated similarly to an image photographed by the digital still camera (for instance, the direct print operation is carried out).

Now, the scan to print and storage operation will be described below.

The contents of the processes of the scan to print and storage operation are substantially the same as the contents of the processes carried out in the scan-to-print operation until the printing and outputting processes. The scan to print and storage operation is different from the scan-to-print operation in view of the point that the scanned image selected and designated by the user is printed and outputted and the scanned image that is printed and designated is simultaneously stored in the external storing media 103. For instance, when images of "A", "B" and "C" are scanned, if the images of "A" and "C" are selected and designated as objects to be printed, the scanned images of "A" and "C" are printed and outputted and the thumbnail image data and the main image data of the scanned images are stored in the external storing media 103.

Figure 22:
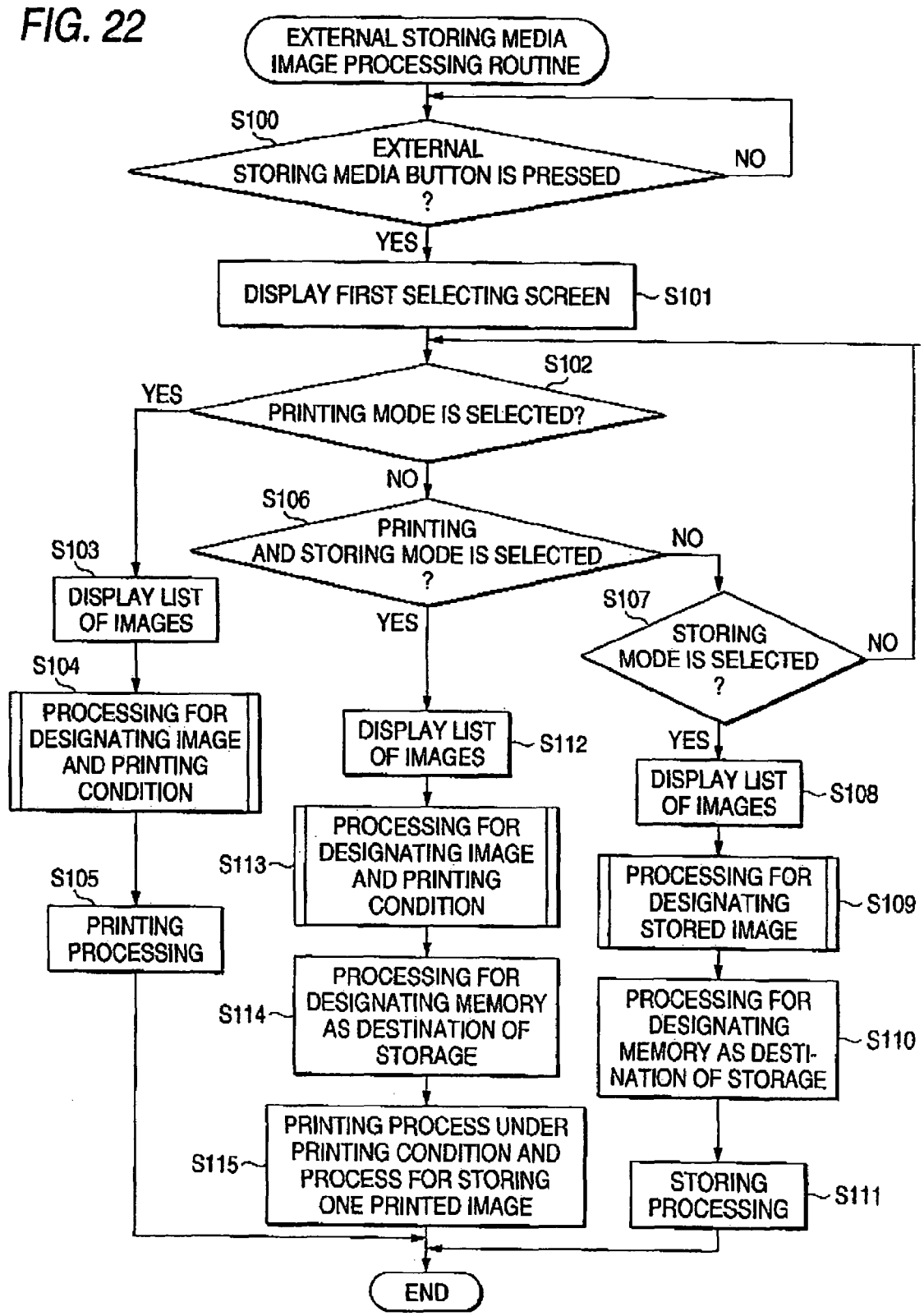
FIG. 22 is a flowchart showing an image processing routine in the external storing media.

Now, a procedure carried out when the controller 116 performs the image process in the external storing media will be described in accordance with a flowchart shown in FIG. 22.

In step 100, whether or not the external storing media button 110*a* is pressed down is decided. When the external storing media button 110*a* is pressed down, the procedure moves to step 101. When the external storing media button 110*a* is not pressed down, a process is waited for.

In the step 101, the first selecting screen 126 (see FIG. 17) is displayed on the preview monitor 105. At this time, the user uses the selecting button 112 and the OK button 113 on he operating panel 104 to select and designate a desired item among the items (the printing mode, the storing mode and the printing and storing mode) of the first selecting screen 126.

In step 102, whether or not the printing mode is selected on the first selecting screen 126 is decided. Here, when the printing mode is selected, the procedure moves to step 103. When the printing node is not selected, the procedure moves to step 106.

In the step 103, the thumbnail images of the images stored in the external storing media 103 are displayed on the review monitor 105 as a list so as to perform the direct print operation in such a way that printing conditions (the number of print sheets) can be inputted for each image. That is, the list screen 131 for images to be printed that is shown in FIG. 20 is displayed on the preview monitor 105.

In step 104, a process for designating an image and printing conditions is performed. That is, the user operates the selecting button 112 of the operating panel 104 to set the selecting frame 132 to the image desired to be printed among the images of the list screen 131 for images to be printed, and then operates the number of print sheet button 115 to input the number of print sheets.

In step 105, after the process for designating the image and the printing conditions is completed, the printing process is performed under a condition that the start button 109*a*(109*b*) is pressed. Accordingly, the image selected and designated among the images in the external storing media 103 in the step 104 is printed and outputted.

In the step 106, whether or not the printing and storing mode is selected on the first selecting screen 126 is decided. Here, when the printing and storing mode is not selected, the procedure moves to step 107. When the printing and selecting mode is selected, the procedure moves to step 112.

In the step 107, whether or not the storing mode is selected on the first selecting screen 126 is decided. Here, when the storing mode is selected, the procedure moves to step 108. When the storing mode is not selected, the procedure returns to the step 102 to decide again which mode is selected.

In the step 108, in order to perform the backup operation, the thumbnail images of the images stored in the external storing media 103 are displayed as a list on the preview monitor 105 so as be stored and designated. That is, the list screen 135 for images to be stored that is shown in FIG. 21 is displayed on the preview monitor 105.

In step 109, a process is performed for designating a stored image in which the image as an object to be stored is selected and designated. That is, the user operates the selecting button 112 of the operating panel 104 to set the selecting frame 136 to the image desired to be stored among the images on the list screen 135 for images to be stored, and then, presses the plus button 115*a* of the number of print sheet button 115 to perform the storing check.

In step 110, a process is performed for designating a memory as a destination of storage in which the destination of storage of the selected and designated image is designated. That is, the user operates the operating panel 104 to designate the memory as the destination of storage (for instance, the CD-R drive).

In step 111, after the process for designating a stored image and the process for designating a memory as a destination of storage are finished, the storing process is performed under a condition that the OK button 113 is pressed. Accordingly, the image selected and designated in the step 109 among the images in the external storing media 103 is stored in other external storing media 103 (for instance, the memory card to the CD-R drive).

In the step 112, to perform the direct print and storage operation, the thumbnail images of the images stored in the external storing media 103 are displayed as a list on the preview monitor 105 under a state in which printing conditions (the number of print sheets) can be inputted for each image. That is, the list screen 131 for images to be printed that is shown in FIG. 20 is displayed on the preview monitor 105 as in the case of the direct print operation.

In step 113, a process for designating an image and printing conditions is performed in the same manner as that of the step 104.

In step 114, a process is performed for designating a memory as a destination of storage like the step 110. Here, the operating panel 104 is operated by the user to designate, for instance, the CD-R drive as the memory serving as the destination of storage.

In step 115, after the process for designating an image and printing conditions is completed, the printing process and the storing process are performed under a condition that the start button 109*a* (109*b*) is pressed. That is, the designated number of print sheets of the image selected and designated on the list screen 131 for images to be printed is printed and outputted. The image as an object to be printed is stored in the external storing media 103 as the destination of storage one sheet by one sheet.

Now, a procedure made when the controller 116 performs the original copy image process will be described below in accordance with a flowchart shown in FIG. 23.

In step 200, it is decided whether or not the reading button 110*b* is pressed down. When the reading button 110*b* is pressed down, the procedure moves to step 201. When the reading button is not pressed down, the procedure is waited for.

In the step 201, the original copy process selecting screen 127 (see FIG. 18) is displayed on the preview monitor 105. At this time, the user selects the item by the selecting button 112 and designates the item by the OK button 113 to select and designate a desired item from the items (the transparent original copy process, the reflective original copy process) on the original copy process selecting screen 127.

In step 202, the second selecting screen 128 (see FIG. 19) is displayed on the preview monitor 105. At this time, the user uses the selecting button 112 and the OK button 113 on the operating panel 104 to select and designate a desired item among the items (the scan to print mode, the scan to storage mode, the scan to print and storage mode) on the second selecting screen 128.

In step 203, it is decided whether or not the print mode is selected on the second selecting screen 128. Here, when the scan to print mode is selected, the procedure moves to step 204. When the scan to print mode is not selected, the procedure moves to step 208.

In the step 204, to perform the scan-to-print operation, a pre-scanning operation is carried out. That is, the original copy sheet 138 such as the photograph film strip is pre-scanned to obtain the thumbnail image data of the original copy images 138A to 138C of the original copy sheet 138.

In step 205, the thumbnail images of the images obtained by the pre-scanning operation are displayed on the preview monitor 105 under a state in which printing conditions (the number of print sheets) can be inputted for each image. Namely, the list screen 131 for images to be printed that is shown in FIG. 20 is displayed on the preview monitor 105.

In step 206, the process for designating an image and printing conditions is performed in the same manner as that of the step 104.

In step 207, when the process for designating an image and printing conditions is finished, the scan-to-print operation is performed under a condition that the start button 109*a* (109*b*) is pressed. Accordingly, the images selected and designated in the step 206 among the scanned images fetched by the pre-scanning operation are sequentially mainly scanned, printed and outputted.

In the step 208, it is decided whether or not the scan to print and storage mode is selected on the second selecting screen 128. Here, when the scan to print and storage mode is not selected, the procedure moves to step 209. When the scan to print and storage mode is selected, the procedure moves to step 215.

In the step 209, it is decided whether or not the scan to storage mode is selected on the second selecting screen 128. Here, when the scan to storage mode is selected, the procedure moves to step 210. When the scan to storage mode is not selected, the procedure returns to the step 203 to decide again which mode is selected.

In the step 210, to perform the scan-to-memory operation, the pre-scanning operation is performed in the same manner as that of the step 204.

In step 211, the thumbnail images of the images obtained by the pre-scanning operation are displayed on the preview monitor 105 as a list in such a state as to be stored and designated. Namely, the list screen 135 for images to be stored that is shown in FIG. 21 is displayed on the preview monitor 105.

In step 212, a process is performed for designating a stored image in which the image as an object to be stored is selected and designated similarly to the step 109.

In step 213, a process is performed for designating a memory as a destination of storage in which the destination of storage of the selected and designated image is designated in the same manner as that of the step 110. Here, the operating panel 104 is operated by the user to designate, for instance, the memory card as a memory serving as the destination of storage.

In step 214, after the process for designating a stored image and the process for designating a memory as a destination of storage are finished, the scan to storage operation is performed under a condition the OK button 113 is pressed. Namely, the images selected and designated in the step 212 among the scanned images fetched by the pre-scanning operation are sequentially mainly scanned and the main image data thereof is coordinated with the thumbnail image data of the images and stored in the external storing media 103.

In step 215, to perform the scan to print and storage operation, the pre-scanning operation is carried out in the same manner as that of the step 204 or the step 210.

In step 216, the thumbnail images of the images obtained by the pre-scanning operation are displayed on the preview monitor 105 as a list in such a state as to input printing conditions (the number of print sheets) for each image. Namely, the list screen 131 for images to be printed that is shown in FIG. 20 is displayed on the preview monitor 105 like the case of the scan-to-print operation.

In step 217, the process for designating an image and printing conditions is performed in the same manner as that of the step 206.

In step 218, the process for designating a memory as a destination of storage is performed in the same manner as that of the step 213.

In step 219, when the process for designating an image and printing conditions is finished, the scan-to-print operation and the scan to storage operation are performed under a condition that the start button 109*a* (109*b*) is pressed. That is, the images selected on the list screen 131 for images to be printed undergo the scan-to-print operation. The thumbnail image data and the main image data of the images to be printed are stored in the external storing media 103 as the destination of storage.

According to the structure of the second embodiment, below-described effects can be obtained.

(1) When the multifunction printer apparatus 101 is located in the printing mode (the printing and storing mode), the list screen 131 for images to be printed is displayed on the preview monitor 105 as a screen for selecting and designating the images to be printed. When the multifunction printer apparatus 101 is located in the storing mode, the list screen 135 for images to be stored is displayed on the preview monitor 105 as a screen for selecting and designating the images to be stored. Accordingly, the screens for selecting and designating the images to be processed among the plurality of images can be displayed in the display forms respectively suitable for the mode. Further, an operation that the images of the list are displayed on the preview monitor 105 to select and designate the images to be processed therefrom can be carried out not only in the printing mode, but also in the storing mode. Further, in the operation that the images of the list are displayed on the preview monitor 105 and the images as the objects are selected therefrom, a selecting operation is greatly easily performed in a visual point of view. In this embodiment, since this selecting and designating form is employed both for the printing mode and the storing mode, the images can be easily selected and designated in both the modes.

(2) In the printing mode (the printing and storing mode), the number of print sheets is displayed for the image to be printed among the images of the list on the list screen 131 for images to be printed. This indicates that the image is designated as the objet to be printed. Accordingly, the user can readily understand which image is designated as the object to be printed among the plurality of images fetched from the external storing media 103 or the image scanner 117 and what number of sheets of the image is to be printed.

(3) In the storing mode, the storing checks 137*a* are respectively given to the images designated as objects to be stored among the images of the list on the list screen 135 for images to be stored. Accordingly, since the storing check 137*a* is given to each image of the images to be stored, the images as the objects to be stored can be easily discriminated from the images that are not the objects to be stored. Thus, the user can immediately understand which images of the images in the list are the images as the objects to be stored.

(4) Both in the image process in the external storing media (namely, the operating mode when the external storing media button 110*a* is pressed) and the original copy image process (namely, the operating mode when the reading button 110*b* is pressed), the processing mode (the printing mode, the storing mode and the printing and storing mode) is selected. Accordingly, the processing mode can be selected both in the image process in the external storing media and the original copy image process.

(5) The number of print sheet button 115 is employed when the number of print sheets is inputted during the printing mode and also used when the storing check 137a is given to an image during the storing mode. Thus, the number of print sheet button 115 can be commonly used for both the modes of the printing mode and the storing mode. For instance, the number of parts, a cost and the size of the device can be more reduced than a case in which buttons are separately provided.

(6) Since the total number of print sheets is displayed on the list screen 131 for images to be printed, the user can successively recognize the total number of print sheets. Further, since the remaining storage capacity of the external storing media 103 as the destination of storage of the image is displayed on the list screen 135 for images to be stored, the user can readily recognize what quantity of images can be stored more in the external storing media 103.

(7) The printing and storing mode in which the image set as the object to be printed is printed and outputted and the image as the object to be printed is stored in the external storing media 103 is provided as the processing mode of the multifunction printer apparatus 101. Consequently, when the printing operation is carried out, the image as the object to be printed is not only printed, but also stored. Thus, a labor and time for the storing operation can be saved to improve the utility of the device.

The second embodiment may be changed as described below.

Modified Example 1

The data storing form of the external storing media 103 is not limited to the EXIF file form and may be, for instance, a storing form for storing only main images. In this case, when thumbnail images are displayed on the preview monitor 105, the main images are thinned.

Modified Example 2

The preview monitor 105 may be a touch panel type. In this case, the group of various kinds of buttons 106 and 111 can be omitted.

Modified Example 3

The buttons for setting the operating mode of the multifunction printer apparatus 101 are not limited to the external storing media button 110a an the reading button 110b and, for instance, a button for a copy process may be provided as well as these buttons.

Modified Example 4

The multifunction printer apparatus 101 does not necessarily set the number of print sheets during the printing mode. The multifunction printer apparatus may be, for instance, a machine type in which a function for inputting the number of print sheets is omitted and only a function for selecting an image as an object to be printed is provided.

Modified Example 5

The destination of storage of the image (a storing unit) required when the back up operation, the direct print and storage operation, the scan-to-memory operation and the scan to print and storage operation are carried out is not limited to the external storing 103, and may be, for instance, a memory in the multifunction printer apparatus 101 or the memory of a host computer. Further, the backup operation during the printing mode (the printing and storing mode) is not limited to a storage from a predetermined memory to other memory, and may be, for instance a storage from a predetermined folder to other folder. Further, an object (a recording medium) from which the image is read during the back up operation and the direct print and storage operation is not limited to the external storing media 103, and may be, for instance, the memory in the multifunction printer apparatus 101 or the memory of the host computer.

Modified Example 6

In the printing mode, the images as the objects to be printed can be collectively selected. In the storing mode, the images may be also collectively selected similarly thereto.

Modified Example 7

A printing device is not limited to the multifunction printer apparatus 101, and may be a machine type having no scanning function (that is, a stand-alone type). Further, the printing device does not necessarily have a function for reading, printing and outputting the image of the external storing media 103, and may be a machine type that saves this function.

Modified Example 8

The printing device is not limited to the ink jet type printer, and may be, for instance, a dot impact type, a thermal type, a thermal transfer type and a laser type.

A technical idea that can be grasped from the above-described second embodiment and other examples will be additionally described below.

(1) A program for displaying image selecting information performed by a computer when an image to be processed under a mode is designated upon performing a predetermined process suitable for each mode relative to the image displayed on a display unit, the program comprising: a procedure for obtaining a processing mode of a device selected by a user, a procedure for displaying on the display unit at least one or more images on the basis of fetched image data to designate the image to be processed under the selected processing mode and displaying on the display unit selecting information for designating the image in a display form suitable for each mode, a procedure for fetching the image designated by the user on the basis of the selecting information among the images displayed on the display unit and a procedure for performing a process according to the set processing mode to the fetched image data by the computer.

(2) A printing device comprising the display device, a scanning unit that can scan an image and a printing mechanism that can print and output image data scanned by the scanning unit to a printing medium.

(3) The storing unit is an external storage device detachably attached to the device.

The embodiment of the present invention is described above, however, the embodiment shows only an example for explaining the present invention. It is to be understood that the scope of the invention is not limited only to this embodiment. The present invention may be put into practice in other various forms without departing the gist of the invention. It is to be understood that the first embodiment combined with the second embodiment is included within the scope of the present invention.

What is claimed is:

1. An image processing method comprising:
   a pre-scanning operation of pre-scanning an original copy sheet to read pre-scanned image data with a predetermined low resolution;
   an encoded thumbnail image forming operation of encoding the pre-scanned image data to form thumbnail image data of a predetermined code form;
   a main scanning operation of main-scanning the original copy sheet to read main image data with a predetermined high resolution;
   an encoded main image forming operation of encoding the main image data to form encoded main image data of a predetermined code form;
   an operation of forming a data file of a predetermined form including the thumbnail image data and the encoded main image data; and
   a storing operation of performing a predetermined process to the thumbnail image data formed in the thumbnail image data forming operation when an aspect ratio of the image of the original copy sheet is different from an predetermined aspect ratio for the thumbnail image data of the data file and storing the thumbnail image data having the predetermined aspect ratio in the data file.

2. The image processing method according to claim 1, wherein when an area of the image of the original copy sheet is included in an area of an image based on the thumbnail image data having the predetermined aspect ratio and when two opposed sides of the image of the original copy sheet are arranged so as to be overlapped on two opposed sides of the image based on the thumbnail image, a process is carried out for making up for a space area on the thumbnail image where the data of the image of the original copy sheet does not exist by a predetermined image and the thumbnail image data that undergoes the above-described process is stored in the data file.

3. The image processing method according to claim 1, wherein the thumbnail image data is stored in the data file so that the direction of a long side of the thumbnail image data of the data file corresponds to the direction of a long side of the image of the original copy sheet.

4. An image processing apparatus comprising:
   an image scanner that reads an image from an original copy;
   a storage device that stores image data;
   a pre-scanning control unit that controls the image scanner to pre-scan the original copy sheet and output pre-scanned image data with a predetermined low resolution;
   an encoded thumbnail image forming unit that encodes the pre-scanned image data to form thumbnail image data of a predetermined code form;
   a thumbnail image storage control unit that stores the thumbnail image data in the storage device;
   a main scanning control unit that controls the image scanner to main-scan the original copy sheet and output main image data with a predetermined high resolution;
   an encoded main image forming unit that encodes the main image data to form encoded main image data with a predetermined code form;
   a main image storage control unit that stores the encoded main image data formed by the encoded main image forming unit in the storage device;
   a file forming unit that forms a data file of a predetermined form in which the thumbnail image data and the encoded main image data can be stored; and
   a storage device that performs a predetermined process to the thumbnail image data formed by the encoded thumbnail image forming unit when an aspect ratio of the image of the original copy sheet is different from an predetermined aspect ratio for the thumbnail image data of the data file and that stores the thumbnail image data having the predetermined aspect ratio in the data file.

* * * * *